United States Patent
Owejan et al.

(10) Patent No.: US 10,502,438 B2
(45) Date of Patent: Dec. 10, 2019

(54) LATENT AND SENSIBLE COOLING MEMBRANE HEAT PUMP

(71) Applicant: The Research Foundation for the State University of New York, Albany, NY (US)

(72) Inventors: Jon P. Owejan, Honeoye, NY (US); Nathan C. DeMario, South Wales, NY (US)

(73) Assignee: THE RESEARCH FOUNDATION FOR THE STATE UNIVERSITY OF NEW YORK, Albany, NY (US)

( * ) Notice: Subject to any disclaimer, the term of this patent is extended or adjusted under 35 U.S.C. 154(b) by 16 days.

(21) Appl. No.: 15/573,577

(22) PCT Filed: May 13, 2016

(86) PCT No.: PCT/US2016/032440
§ 371 (c)(1),
(2) Date: Nov. 13, 2017

(87) PCT Pub. No.: WO2016/183477
PCT Pub. Date: Nov. 17, 2016

(65) Prior Publication Data
US 2018/0180307 A1    Jun. 28, 2018

Related U.S. Application Data

(60) Provisional application No. 62/160,671, filed on May 13, 2015.

(51) Int. Cl.
*F24F 3/147* (2006.01)
*B01D 53/26* (2006.01)
(Continued)

(52) U.S. Cl.
CPC .............. *F24F 3/147* (2013.01); *B01D 53/26* (2013.01); *B01D 53/268* (2013.01);
(Continued)

(58) Field of Classification Search
CPC .. F24F 3/147; F24F 2003/1435; F24F 5/0035; F24F 3/14; F25B 39/02;
(Continued)

(56) References Cited

U.S. PATENT DOCUMENTS

| 4,018,584 A | 4/1977 | Mullen |
| 5,450,731 A | 9/1995 | DiPeri et al. |

(Continued)

FOREIGN PATENT DOCUMENTS

| CN | 101906800 B | 5/2012 |
| EP | 0308497 B1 | 12/1994 |

(Continued)

OTHER PUBLICATIONS

International Search Report issued in International Application No. PCT/US2016/032440, dated Aug. 19, 2016.

*Primary Examiner* — Emmanuel E Duke
(74) *Attorney, Agent, or Firm* — Heslin Rothenberg Farley & Mesiti P.C.; Alana M. Fuierer, Esq.

(57) ABSTRACT

A membrane-based assembly and process for cooling and/or de-vaporizing a gas. The assembly and process can provide sensible cooling and/or dehumidification of air, and can be contained within a single, integrated apparatus.

13 Claims, 17 Drawing Sheets

(51) Int. Cl.

| | | |
|---|---|---|
| *F24F 3/14* | (2006.01) | |
| *B01D 69/10* | (2006.01) | |
| *B01D 71/36* | (2006.01) | |
| *B01D 71/48* | (2006.01) | |
| *B01D 71/52* | (2006.01) | |
| *B01D 71/54* | (2006.01) | |
| *B01D 71/68* | (2006.01) | |
| *B01D 71/82* | (2006.01) | |
| *B01D 61/36* | (2006.01) | |
| *B32B 5/02* | (2006.01) | |
| *B32B 5/16* | (2006.01) | |
| *B32B 7/02* | (2019.01) | |
| *B32B 7/12* | (2006.01) | |
| *B32B 15/08* | (2006.01) | |
| *B32B 15/18* | (2006.01) | |
| *B32B 15/20* | (2006.01) | |
| *B32B 23/10* | (2006.01) | |
| *B32B 23/12* | (2006.01) | |
| *B32B 27/12* | (2006.01) | |
| *B32B 27/14* | (2006.01) | |
| *B32B 27/28* | (2006.01) | |
| *B32B 27/30* | (2006.01) | |
| *B32B 27/32* | (2006.01) | |
| *B32B 27/36* | (2006.01) | |
| *B32B 3/26* | (2006.01) | |
| *B32B 3/28* | (2006.01) | |
| *F24F 5/00* | (2006.01) | |
| *F25B 39/02* | (2006.01) | |
| *B01D 53/22* | (2006.01) | |
| *F25B 19/00* | (2006.01) | |

(52) U.S. Cl.
CPC ......... *B01D 61/366* (2013.01); *B01D 69/10* (2013.01); *B01D 71/36* (2013.01); *B01D 71/48* (2013.01); *B01D 71/52* (2013.01); *B01D 71/54* (2013.01); *B01D 71/68* (2013.01); *B01D 71/82* (2013.01); *B32B 3/26* (2013.01); *B32B 3/266* (2013.01); *B32B 3/28* (2013.01); *B32B 5/02* (2013.01); *B32B 5/024* (2013.01); *B32B 5/026* (2013.01); *B32B 5/16* (2013.01); *B32B 7/02* (2013.01); *B32B 7/12* (2013.01); *B32B 15/08* (2013.01); *B32B 15/18* (2013.01); *B32B 15/20* (2013.01); *B32B 23/10* (2013.01); *B32B 23/12* (2013.01); *B32B 27/12* (2013.01); *B32B 27/14* (2013.01); *B32B 27/285* (2013.01); *B32B 27/286* (2013.01); *B32B 27/308* (2013.01); *B32B 27/322* (2013.01); *B32B 27/36* (2013.01); *F24F 3/14* (2013.01); *F24F 5/0035* (2013.01); *F25B 39/02* (2013.01); *B01D 2053/222* (2013.01); *B01D 2257/80* (2013.01); *B01D 2258/06* (2013.01); *B01D 2325/42* (2013.01); *B32B 2250/40* (2013.01); *B32B 2255/10* (2013.01); *B32B 2255/26* (2013.01); *B32B 2262/0253* (2013.01); *B32B 2262/0261* (2013.01); *B32B 2262/14* (2013.01); *B32B 2264/0257* (2013.01); *B32B 2264/12* (2013.01); *B32B 2307/724* (2013.01); *B32B 2307/726* (2013.01); *B32B 2307/728* (2013.01); *B32B 2307/7242* (2013.01); *B32B 2307/7265* (2013.01); *F24F 2003/1435* (2013.01); *F25B 19/00* (2013.01)

(58) Field of Classification Search
CPC . F25B 19/00; B32B 23/10; B32B 5/02; B32B 5/024; B32B 5/026; B32B 5/16; B32B 7/02; B32B 7/12; B32B 15/08; B32B 15/18; B32B 15/20; B32B 23/12; B32B 27/12; B32B 27/14; B32B 3/28; B32B 3/266; B32B 3/26; B32B 27/36; B32B 27/322; B32B 27/308; B32B 27/286; B32B 27/285; B32B 2307/7265; B32B 2250/40; B32B 2307/726; B32B 2255/10; B32B 2255/26; B32B 2307/7242; B32B 2262/0253; B32B 2262/0261; B32B 2262/14; B32B 2307/728; B32B 2307/724; B32B 2264/12; B32B 2264/0257; B01D 2053/222; B01D 2257/80; B01D 71/52; B01D 53/268; B01D 71/36; B01D 71/48; B01D 69/10; B01D 71/54; B01D 71/68; B01D 71/82; B01D 61/366; B01D 53/26; B01D 2258/06; B01D 2325/42

See application file for complete search history.

(56) References Cited

U.S. PATENT DOCUMENTS

| | | |
|---|---|---|
| 5,946,931 A | 9/1999 | Lomax et al. |
| 6,739,142 B2 | 5/2004 | Korin |
| 7,188,480 B2 | 3/2007 | Korin |
| 7,234,309 B2 | 6/2007 | Lee et al. |
| 8,182,954 B2 | 5/2012 | Darling et al. |
| 2008/0241607 A1 | 10/2008 | Owejan et al. |
| 2012/0117987 A1 | 5/2012 | Claridge et al. |
| 2012/0118147 A1* | 5/2012 | Claridge .............. B01D 53/268 95/52 |
| 2013/0199370 A1* | 8/2013 | Okada .................. B01D 53/228 95/52 |
| 2013/0206576 A1* | 8/2013 | Goel ..................... B01D 3/002 202/202 |
| 2013/0298766 A1* | 11/2013 | Ehrenberg .......... B01D 53/268 95/52 |

FOREIGN PATENT DOCUMENTS

| | | |
|---|---|---|
| JP | 2007/203280 A | 8/2007 |
| WO | 2013111693 A1 | 8/2013 |

* cited by examiner

LATENT AND SENSIBLE COOLING MEMBRANE HEAT PUMP

CROSS REFERENCE TO RELATED APPLICATIONS

This application is a national stage filing under 35 U.S.C. § 371 of International Application No. PCT/US2016/032440, filed May 13, 2016, and published as WO 2016/183477 A1 on Nov. 17, 2016, which claims benefit of priority from U.S. Provisional Patent Application No. 62/160,671, filed May 13, 2015, the entire contents of each of the prior applications are incorporated herein by reference in their entirety.

FIELD OF THE INVENTION

The invention relates generally to an apparatus, system and method for cooling and/or dehumidifying air. More particularly, the invention provides a compact system that combines latent and sensible energy regulation in a single assembly capable of using only liquid water and humidified air in conjunction with one or more selectively permeable membranes and a flow volume region through which flows a working fluid under partial vacuum.

BACKGROUND OF THE INVENTION

Cooling systems, as found e.g. in HVAC equipment, typically employ vapor-compression technology. Many of the refrigerants historically used in such systems are environmentally problematic. Alternative systems for cooling that do not rely on vapor-compression include evaporative chillers and membrane heat pumps.

Evaporative chillers use liquid water to absorb sensible heat from a fluid source, usually outside air, by evaporating the water to cool the air. But they are limited as a practical matter to environments where the outside air is dry and hot; and their efficacy decreases with increasing air humidity; moreover, their dehumidification abilities are limited and they often entail high water usage.

Membrane heat pumps provide sensible and latent cooling by utilizing selectively permeable membranes that enable both water molecules and the thermal energy that is related to evaporation to move. Current systems, however, are large and complex, and employ separate equipment and process stages, including multiple membranes, for the latent and sensible cooling functions. The systems typically also require a large expirator and vapor pump(s), and do not provide for recapturing and reusing waste heat from other processes.

There is thus a need for improved membrane heat pumps that are scalable, simplified and compact, energy-efficient, and have enhanced performance efficiency through thermal activation.

In one non-limiting aspect thereof, exemplary embodiments of the invention provide a membrane-based assembly comprising a vapor-removing element comprising, at least one flow volume region adapted to receive a working fluid flow under partial vacuum, the at least one flow volume region having a first surface in mass transfer relationship with a first side of a first selectively permeable membrane, the first selectively permeable membrane having a second side configured for contact with a vapor-containing gas to permit transfer of at least a portion of the vapor from the vapor-containing gas through the selectively vapor-permeable membrane and into the working fluid flow.

In yet another non-limiting aspect thereof, exemplary embodiments of the invention provide a membrane-based assembly comprising a cooling element, wherein the cooling element comprises a mass transfer relationship between the working fluid flow and an evaporable liquid to permit formation of an evaporant from the evaporable liquid and transfer of at least a portion of the evaporant from the liquid into the working fluid flow.

In non-limiting aspects thereof, the mass transfer relationship between the working fluid flow and an evaporable liquid comprises a second selectively-permeable membrane. In still other non-limiting aspects thereof, the mass transfer relationship between the working fluid flow and an evaporable liquid does not require a second selectively-permeable membrane.

In yet another non-limiting aspect thereof, a membrane-based assembly comprises a combination of the cooling and vapor-removing elements in a single, integrated unit.

In yet another non-limiting aspect thereof, embodiments provide an apparatus comprising a plurality of vapor-removing assemblies, cooling assemblies, and/or combinations thereof disposed in a stacked arrangement.

In yet another non-limiting aspect thereof, a system is provided comprising a dehumidifying and/or cooling apparatus; a vacuum pump to initiate the partial vacuum within the working fluid; and an expirator for maintaining the system under partial vacuum. In non-limiting aspects thereof, the membrane-based expirator comprises at least one third selectively permeable membrane having a first side in mass transfer relationship with the working fluid and; a fluid displacement device, wherein said fluid displacement device creates conditions sufficient to permit the water vapor contained with the working fluid to transfer from the working fluid through the third selectively permeable membrane to a second side of the third membrane. In yet another non-limiting aspect thereof, the expirator is thermally activated using thermal energy from a waste heat source.

In yet another non-limiting aspect thereof, exemplary embodiments of the invention provide that the selectively permeable membranes comprise a microporous PTFE membrane, a perfluorosufonate ionomer membrane, a PTFE/PAO/PU membrane, a PTFE/PAO/PU laminate, a polyester/polyether membrane, a polyester/polyether laminate, a derivatized cellophane membrane, a chemical protective laminate, flashspun high-density polyethylene fiber paper, flashspun high-density polyethylene fiber paper impregnated with a vapor permeable polymer, polyethersulfone, sulfonated poly(ether ether ketone), or combinations thereof.

In yet another non-limiting aspect thereof, exemplary embodiments of the invention provide a process for removing vapor from a vapor-containing gas and/or cooling an evaporable liquid.

BRIEF DESCRIPTION OF THE DRAWINGS

The subject matter which is regarded as the invention is particularly pointed out and distinctly claimed in the claims at the conclusion of the specification. The foregoing and other features and advantages of the invention will be readily understood from the following detailed description of the preferred embodiments taken in conjunction with the accompanying drawings in which:

DESCRIPTION OF THE ILLUSTRATIVE EMBODIMENTS

Figure 1:
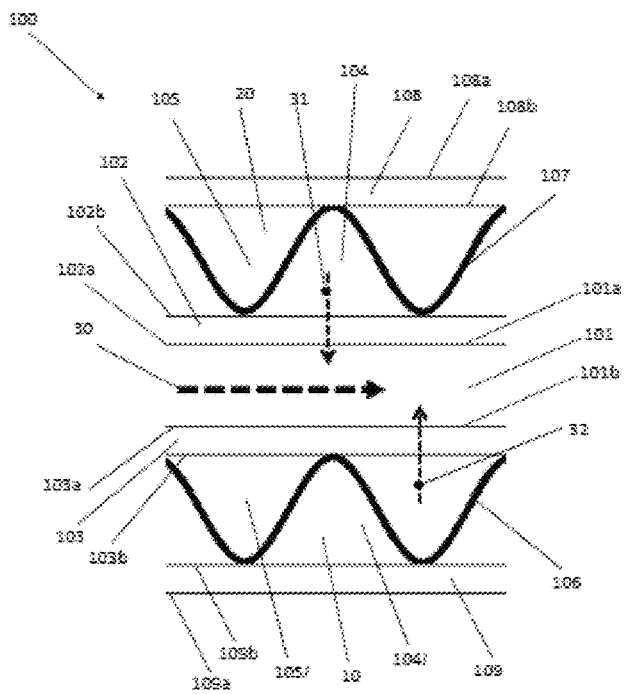
FIG. 1 is a partial cross-section illustration of a flow volume region within a dehumidifying and chilling assembly.

For the purposes of promoting an understanding of the principles of the invention, reference will now be made to the embodiments illustrated in the drawings and specific language will be used to describe the same. The foregoing summary and general description of the invention, and the ensuing detailed description, are exemplary and not restrictive of the invention. No limitation of the scope of the invention is intended, and any alterations and further modifications in the illustrated embodiments, and any further applications of the principles of the invention as illustrated therein as would normally occur to one skilled in the art to which the invention relates are contemplated and protected.

The terminology used herein is for the purpose of describing particular embodiments only and is not intended to be limiting of the invention. As used herein, the singular forms "a", "an", "the" and "at least one" are used interchangeably and intended to include both the singular and plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended, non-limiting linking verbs that do not exclude additional elements, steps, parts of an assembly or structural element. As a result, a method or device that "comprises", "has", "includes" or "contains" one or more steps or elements possesses those one or more steps or elements, but is not limited to possessing only those one or more steps or elements and does not exclude additional, unrecited elements or steps. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

Glossary

As used herein, the following terms have the following meanings:

Conditioned Air or Fluid: Air or fluid that has been adjusted for desirable temperature and RH.

Relative Humidity or RH: The ratio of the partial pressure of water vapor to the equilibrium vapor pressure of water at the same temperature (i.e., the percent of moisture in the fluid (e.g., air) compared to the maximum amount of moisture the fluid (e.g., air) can hold at that temperature).

Supply Air: Conditioned air that exits from a cooling or heating system and is introduced into a structure.

Return Air: The air introduced into a system for cooling or heating.

Vacuum plenum: A flow path comprising a low absolute pressure area (vacuum), wherein the flow path may be defined by a flow volume region, porous material or substrate, channels, ducts or a chamber.

Dehumidification: A process by which moisture is removed from a fluid (e.g., air).

In one embodiment, a dual-membrane assembly is provided wherein one or more first and second selectively permeable membranes are integrated into a combined cooling and dehumidifying assembly. More specifically, an integrated assembly is provided comprising a flow volume region that is adapted to receive a working fluid flow therethrough, the flow volume region having a first surface in mass transfer relationship with a first side of a first selectively permeable membrane, the first selectively permeable membrane having a second side configured for contact with a vapor-containing gas to permit transfer of at least a portion of the vapor from the vapor-containing gas through the selectively vapor-permeable membrane and into the working fluid flow; and further comprising a second selectively permeable membrane, the second selectively permeable membrane having a first side in mass transfer relationship with a second surface of the flow volume region, and having a second side configured for contact with an evaporable liquid to permit formation of an evaporant from the evaporable liquid and permit transfer of at least a portion of the evaporant through the second selectively permeable membrane and into the working fluid flow in vapor phase. Mass transfer relationship includes without limitation proximity, sizing, and operating conditions that enable and permit the transfer of water vapor through the membrane and into the working fluid flow. In still another embodiment, a system comprises multiple stacks of the assembly in a single, compact unit and a separate expirator system. In yet another embodiment, the system comprises a condenser and/or waste heat enhancement device.

In still another exemplary embodiment, a single-membrane integrated assembly is provided wherein one or more first selectively permeable membranes is integrated with a vacuum plenum-based evaporator to provide a combined cooling and dehumidifying assembly. More specifically, an integrated assembly is provided comprising a flow volume region that is adapted to receive a working fluid flow therethrough, the flow volume region having a first surface in mass transfer relationship with a first side of a selectively permeable membrane, the selectively permeable membrane having a second side configured for contact with a vapor-containing gas to permit transfer of at least a portion of the vapor from the vapor-containing gas through the selectively vapor-permeable membrane and into the working fluid flow; and further comprising an evaporable liquid in mass transfer relationship with a second surface of the flow volume region, the flow volume region containing a working fluid flow under vacuum to permit formation of an evaporant from the evaporable liquid and transfer of at least a portion of the evaporant in vapor phase into the working fluid flow under vacuum. In still another embodiment, a system comprises multiple stacks of the assembly in a single, compact unit and an expirator. In yet another embodiment, the system comprises a condenser and/or waste heat enhancement device.

In another embodiment, a dehumidification assembly is provided comprising a flow volume region that is adapted to receive a working fluid flow therethrough, the flow volume region in mass transfer relationship with a first side of a selectively permeable membrane, the selectively permeable membrane having a second side configured for contact with a vapor-containing gas to permit transfer of at least a portion of the vapor from the vapor-containing gas through the selectively vapor-permeable membrane and into the working fluid flow. In a preferred embodiment, the vapor-containing gas is air and the vapor is water, although other vapors and gases are contemplated, e.g. natural gas. Mass transfer relationship includes without limitation proximity, sizing, and operating conditions that enable and permit the transfer of the vapor through the membrane and into the working fluid flow. In still another embodiment, a system comprises multiple stacks of the assembly in a single, compact unit and an expirator. In yet another embodiment, the system comprises a condenser and/or waste heat enhancement device.

In yet another embodiment, an evaporative chiller assembly is provided comprising a selectively permeable membrane, the selectively permeable membrane having a first side in mass transfer relationship with a flow volume region, and having a second side configured for contact with an evaporable liquid to permit formation of an evaporant from the evaporable liquid and permit transfer of at least a portion of the evaporant through the selectively permeable membrane and into the working fluid flow. In a preferred embodiment, the evaporable liquid is water, as is the evaporant, although other evaporable liquids are contemplated, e.g. isopropanol alcohol. Mass transfer relationship includes without limitation, proximity, sizing, and operating conditions that enable and permit the evaporation, and transfer of the evaporant vapor through the membrane and into the working fluid flow. In still another embodiment, a system comprises multiple stacks of the assembly in a single, compact unit and an expirator. In yet another embodiment, the system comprises a condenser and/or waste heat enhancement device.

In exemplary embodiments of each of the above, the flow volume region comprises a porous substrate. In still other embodiments, water vapor does not condense in the flow volume region, or within the working fluid flow while that flow is within the assembly. Water vapor is removed from the system by compression and exhausting to atmosphere or by expiration through a selectively permeable membrane system (e.g. an expirator).

In accordance with a preferred exemplary embodiment of the invention, an apparatus is provided wherein the dehumidification assembly and evaporative chiller assembly are integrally formed components of a single apparatus that includes many features that would otherwise be fabricated as individual units or parts within a system.

In accordance with yet another preferred exemplary embodiment of the invention, a system is provided wherein the dehumidification assembly and evaporative chiller assembly is configured with an expirator, wherein the expirator optionally can be thermally activated to enhance system performance. Although not required, the system can also include a condenser to recapture water vapor from the working fluid.

Referring to the figures, which disclose exemplary, non-limiting practices of the present invention:

FIG. 1 is a cross-sectional schematic showing one embodiment of a dehumidifying and cooling assembly 100. In this embodiment, assembly 100 is comprised of a flow volume region 101, shown here in a planar (e.g., flat) configuration, adapted to receive a working fluid flow 30 (e.g., partial vacuum) and first selectively permeable membrane 102 (e.g., a vapor permeable membrane), and second selectively permeable membrane 103 (e.g., an evaporant permeable membrane). In certain embodiments, flow volume region 101 comprises a porous substrate. In the embodiment shown here, membrane 102 is a vapor permeable/gas impermeable membrane having a first side 102*a* in contact with a first surface 101*a* of porous substrate 101. Membrane 102 has a second side 102*b* configured for contact with a vapor-containing gas 10 located within flow path 104. Membrane 103 is an evaporant permeable/liquid impermeable membrane having a first side 103*a* in contact with a second side 101*b* of porous substrate 101. Membrane 103 has a second side 103*b* configured for contact with an evaporable liquid 20 (e.g., liquid water) located within flow path 105.

The configuration of the porous substrate 101 is adapted to receive a flow of a working fluid, e.g. vapor drawn from the vapor-containing gas and evaporant liquid under partial vacuum. In one practice, the working fluid flow is provided by a vapor pump that moves, e.g., preferably about 0.05-0.25 liters per minute (LPM) of vapor per ton of refrigeration (~3.5 kW) at about 0.5-10 kPa.

In embodiments, the porous substrate 101 has a porosity of higher than about 35%, including between about 40% to about 90%, preferably between about 70% and about 90%. Typically, a higher porosity is preferred when the working fluid traversing the porous substrate is gas under partial vacuum. Preferred average pore size for the porous substrate, as measured by porosimetry, is less than about 200 µm, more preferably less than about 100 µm. As will be appreciated, the thickness of the porous substrate varies with the velocity of the working fluid and porosity and is a function of any targeted mass transfer coefficient. In certain embodiments, the thickness of the porous substrate can range from about 1/16 inches (0.159 cm) to about 1/4 inches (0.635 cm) where the porosity is preferably about 90%.

Figure 2:
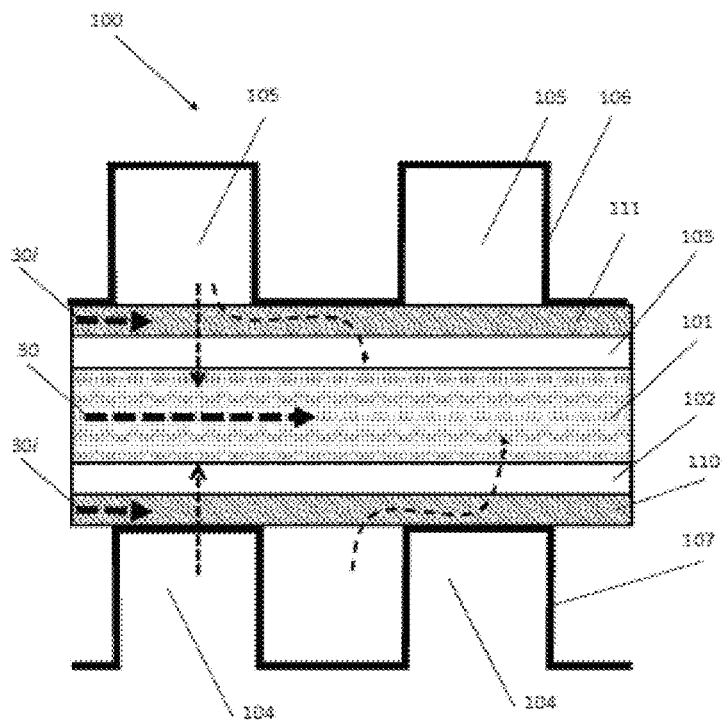
FIGS. 2-4 are partial cross-section illustrations of alternate examples of a flow volume region within a dehumidifying and evaporative chiller assembly.
Figure 3:
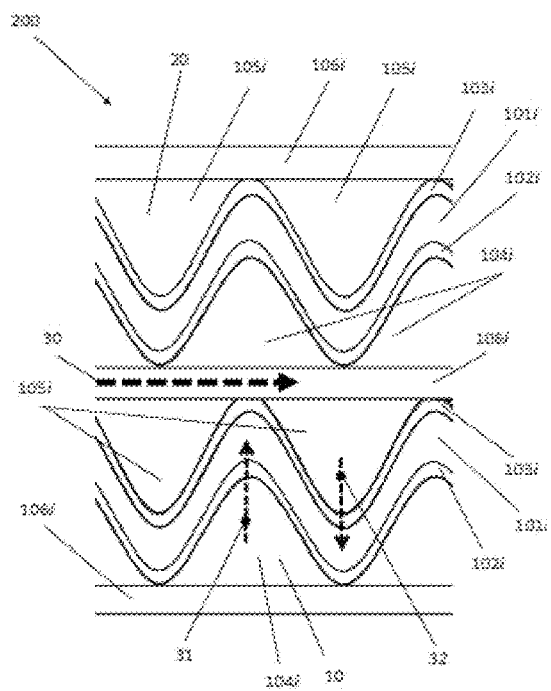
Figure 4:
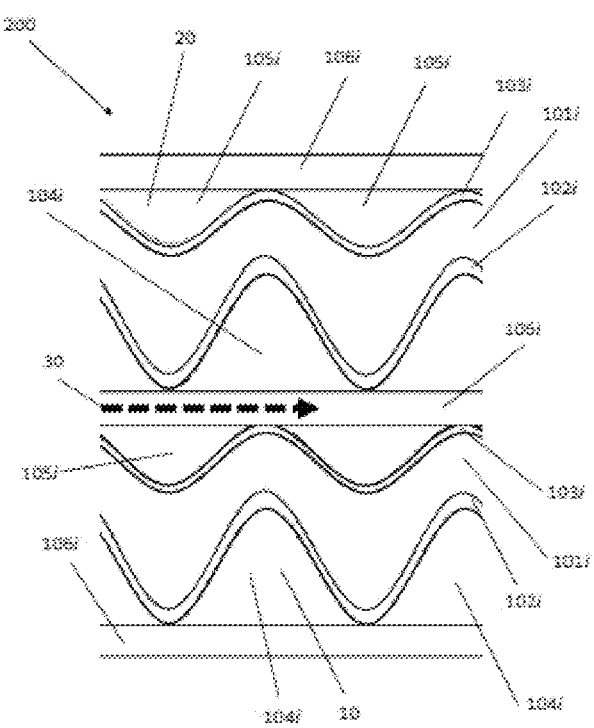

Porous substrate 101 may be of planar configuration as shown in FIG. 1, or corrugated, or of other shape (e.g., see FIGS. 2-4). As used herein, corrugated means, without limitation, a notched, crenulated, sinuous, or similar configuration when viewed in cross section. In one practice, the first and/or second surfaces of the porous substrate are planar or corrugated. In preferred embodiments, the configuration and/or shape of the porous substrate is selected so as to increase surface area on at least one surface of the porous substrate.

Without limitation, in one embodiment, porous substrate 101 is comprised of a porous polymer. Suitable porous polymers include without limitation those comprised of sintered polymers, such as sintered thermoplastic beads, sintered thermoplastic fibers, or mixtures thereof. By way of example, exemplary thermoplastics are polyethylene, polypropylene and the like and mixtures thereof (e.g., as commercially available from Porex®). The porous substrate may also be comprised of a porous metal, including as made from aluminum, stainless steel, copper and the like and mixtures thereof (e.g., as commercially available from SSI Technologies, Inc.). In still other embodiments, the porous substrate may be comprised of a randomly perforated two-dimensional laminate, such as polyacrylonitrile (e.g., as commercially available from Toray®). The porous substrate may be comprised of the same or different combinations of any of the foregoing porous materials or their equivalents, either in a single cooling assembly or a plurality of cooling assemblies. Porous substrates having pore size gradients (e.g., gradually increasing pore size along one direction) as known in the art are also contemplated.

Referring to FIG. 1, the first selectively permeable membrane 102, which is on the vapor-containing gas side of the assembly 100, enables molecules of a particular vapor 31, e.g. water, to transfer through it, but at the same time is substantially impermeable to molecules of the gas component of the vapor-containing gas 10 (e.g., air) under the conditions of operation. In one embodiment, the first selectively permeable membrane 102 is a selectively water vapor permeable/gas (e.g., air) impermeable membrane. In certain embodiments, the first selectively permeable membrane comprises one or more membranes.

The second selectively permeable membrane 103, which is on the evaporable liquid side of the assembly 100, enables an evaporant 32 (e.g., water vapor) from the evaporable liquid 20 to transfer through it, but at the same time is substantially impermeable to the liquid 20 (e.g., water) itself under conditions of operation. In certain embodiments, the second selectively permeable membrane is comprised of one or more such membranes.

In certain embodiments, the first and second selectively permeable membranes may be the same or different as long as they are within the above parameters. Membrane thicknesses in each case are preferably less than about 100 µm, more preferably less than about 40 µm, more preferably between about 25 µm to about 10 µm, inclusive. Without limitation, exemplary first and second selectively permeable membranes can be unlaminated, laminated, monolithic, or combinations thereof, and comprised of the following, non-limiting examples:

Perfluorosulfonate-based ionomer membranes. By way of example, a perfluorinated polymer that contains small proportions of sulfonic or carboxylic ionic functional groups (e.g., commercially available as Nafion® from DuPont®). These membranes are typically monolithic.

PTFE/PAO/PU membranes that comprise an expanded polytetrafluoroethylene (PTFE) membrane partially infiltrated on one side with a polyalkylene-oxide (PAO) polyurethane-urea (PU) coating. Generally, this forms a continuous layer of a hygroscopic polymer component in the membrane. The hygroscopic polymer layer is the controlling factor in water vapor transport across the membrane (e.g., commercially available as Gore-Tex® from W.L. Gore & Associates).

PTFE/PAO/PU laminates that comprise a PTFE/PAO/PU membrane which has been adhesively laminated to an outer woven nylon shell fabric and an inner knit nylon fabric (e.g. commercially available as Gore-Tex® from W.L. Gore & Associates).

Polyester/polyether membranes, that comprise a membrane composed of a monolithic polymer layer composed of a hygroscopic copolymer of polyester and polyether (e.g., commercially available as Sympatex® from Akzo-Nobel).

Polyester/polyether laminates, comprising a polyester/polyether membrane that has been adhesively laminated to an outer woven nylon shell fabric and inner knit nylon fabric (e.g. commercially available as Sympatex® from Akzo-Nobel).

Derivatized cellophane membranes, comprising a cellulosic membrane produced from viscose, modified to prevent organic vapor transport.

Chemical protective laminates, comprising a membrane laminate designed to minimize organic vapor transport while retaining adequate water vapor transfer properties. For example, these laminates typically contain hygroscopic and non-hygroscopic membrane components, laminated to an outer woven nylon fabric and an inner knit nylon fabric.

In addition to the above, polyethersulfone, sulfonated poly(ether ether ketone) membranes may be used. Furthermore, microporous polytetrafluoroethylene (PTFE) membranes can be used as the second selectively permeable (evaporable liquid side) membrane 103. Furthermore, flash-spun high-density polyethylene fiber paper (commercially available as Tyvek® from Dupont™) can be used on as the second selectively permeable (evaporable liquid side) membrane, and flashspun high-density polyethylene fiber paper (commercially available as Tyvek® from Dupont™) impregnated with a vapor permeable polymer can be used for the first or second selectively permeable membrane.

Combinations of any of the foregoing materials, or other suitable membranes, can be employed for the first and/or second selectively permeable membranes.

In certain embodiments, the assembly 100 further comprises one or more separator plates 106, 107. Separator plates 106, 107 provide one or more interiorly-defined channels (e.g., pathways or flow paths) 104, 105 for the vapor-containing gas 10 and/or the evaporable liquid 20.

The one or more channels 104, 105 can be substantially the same size and shape, or they can be different. By way of example, the one or more channels 104 for the vapor-containing gas can be larger than the one or more channels 105 for the evaporable liquid. In one practice, a first separator plate 107 is positioned relative to the second side of the first selectively permeable membrane 102b to define the one or more flow paths 104 for the vapor-containing gas 10. In another practice, a second separator plate 106 positioned relative to the second side of the second selectively permeable membrane 103b to define the one or more channels 105 for the evaporable liquid. As used herein, the terms "interiorly-defined channels," "interiorly-defined pathways," or "interiorly-defined flow paths" are meant to be interchangeable and synonymous.

The separator plates can be of various shapes. By way of example, in the embodiment shown in FIG. 1, first separator plate 107 is shown in corrugated (e.g., sinuous) shape and positioned relative to membrane surface 102b to define one or more channels 104, for vapor-containing gas 10. Second separator plate 106 is shown in corrugated (e.g., sinuous) shape and positioned relative to membrane surface 103b to define one or more channels 105, for evaporable liquid 20. In alternate embodiments, the first and/or second separator plates are of planar shape (see FIGS. 2-4). Without limitation, the first separator plate 107 and second separator plate 106 can each independently be comprised of a molded plastic, a stamped metal, or combinations thereof.

In one embodiment, FIG. 1 conceptually illustrates an assembly wherein structures 108 and 109 comprise structural housing within which assembly 100 is disposed. Alternatively, FIG. 1 conceptually represents a partial view of a stacked arrangement of assemblies 100 wherein structure 108 is another evaporant permeable membrane having a second side 108b configured to be in contact with evaporable liquid 20 in flow path 105i and having a first side 108a in mass transfer relationship with another porous substrate (not shown); and 109 is another vapor permeable membrane having a second side 109b configured to be in contact with vapor-containing gas 10 in flow path 104i, and having a first side 109a in mass transfer relationship with yet another porous substrate (not shown).

With reference to FIG. 1, a non-limiting embodiment, when the system is in operational practice, the working fluid flow 30 (e.g., vapor under partial vacuum) flows through porous substrate 101 under conditions effective to create a low pressure environment within the porous substrate (i.e., a vacuum plenum). The concentration difference created by the working fluid flow 30 in vacuum within porous substrate 101 is effective to pull at least a portion of the vapor 31 (e.g., water) from the vapor-containing gas 10 (e.g., humidified air) across the first selectively permeable membrane 102, into the porous substrate 101 and into the working fluid flow 30. This removes water vapor from the vapor-containing gas 10 (e.g., dehumidifies, including to specified degrees, the humidified air) to produce de-vapored gas. As used herein, the conditions effective to pull vapor 31 through the membrane and out of the vapor-containing gas comprise a pressure differential between one side of the membrane and the other side which drives water molecules through the membrane.

The working fluid flow 30 also preferably creates a partial vacuum across the second selectively permeable membrane 103 effective to evaporate at least a portion of the evaporable liquid 20. The resultant evaporant 32 is pulled across the second selectively permeable membrane 103 and into the working fluid flow 30. The latent heat of evaporation in forming evaporant 32 provides cooling for the remaining liquid in channel 105 which in turn cools the de-vapored gas in channel 104 by heat exchange through membranes 103 and 102, separator plates 106, and porous substrate 101. This cooled liquid then cools the de-vapored gas (e.g., supply air), preferably through the single assembly itself, without need for external heat exchangers to produce conditioned air (e.g., specified RH and temperature).

Water vapor, pulled from liquid 20 and gas 10 via vacuum conditions in the porous substrate, contributes to the flow of working fluid 30 in the porous substrate 101. Although the flow of working fluid 30 is illustrated with an arrow in a particular, singular direction in FIG. 1, it is contemplated that working fluid flow 30 can be in any direction through the porous substrate, wherein the flow direction is dependent on the vacuum head.

Although not limiting, FIG. 2 shows such an alternative embodiment of assembly 100. This embodiment is similar to that shown in FIG. 1, except that it includes additional porous substrates 110 and 111, respectively interposed between membranes 102 and 103 and separator plates 107 and 106. Porous substrates 110 and 111 can be comprised of the same, or different, material as each other and/or porous substrate 101. Optionally, each of porous substrate 110 and 111 can have its own working fluid flow 30i. FIG. 2 also illustrates an alternate configuration for membranes 102 and 103 and separator plates 107 and 106, which are shown in a notched, corrugated form rather than a sinuous form.

FIG. 3 shows yet another embodiment wherein a first and second dehumidification and cooling assembly 100 are in a stacked arrangement to form assembly 200. As shown here, porous substrates 101i, and selectively permeable membranes 102i and 103i, are in a corrugated (e.g., sinuous) shape, and separator plates 106i are in a planar configuration. For assembly 200, and for other assemblies not shown that comprise more than one assembly 100i, it is contemplated that porous substrates 101i, and membranes 102i and 103i, can be comprised of the same or different materials, provided said materials provide the required characteristics.

Although channels 104i and 105i are shown to create substantially equal surface areas for contacting the evaporable liquid 20 and vapor-containing gas 10 in FIG. 3, it is contemplated that one of ordinary skill in the art can modify and enhance the performance of assembly 100i by increasing the surface area created by channels 104i and 105i, thereby maximizing the available surface area operatively configured with the vacuum plenum for mass transfer exchange, and that the surface area created by channels 104i and 105i may be different from the other. For example, in an exemplary embodiment the surface area for contacting the vapor-containing gas 10 is greater than the surface area for contacting the evaporable liquid 20 (e.g., water). By way of example only, FIG. 4 shows an alternate embodiment of assembly 200. In this embodiment, assembly 200 is mechanized in a way similar to assembly 200 in FIG. 3, however the surface area of flow paths 105i for the evaporable liquid 20 is smaller than surface area of flow paths 104i for the vapor-containing gas 10. In other words, there is more surface area for the vapor-containing gas 10 to come in contact with selectively permeable membrane 102 than there is for the evaporable liquid 20 to come in contact with selectively permeable membrane 103.

In alternate embodiments, the assembly comprises multiple porous substrates. In the embodiment shown in FIG. 1, porous substrate 101 is a single porous substrate interposed between the first side of the first selectively permeable membrane and the first side of the second selectively permeable membrane. Optionally, in one embodiment, the assembly will comprise a first and second porous substrate, wherein the second porous substrate is interposed in mass transfer relationship between the first separator plate and the second side of the first selectively permeable membrane; and optionally a third porous substrate interposed in mass transfer relationship between the second separator plate and the second side of the second selectively permeable membrane.

Figure 5A:
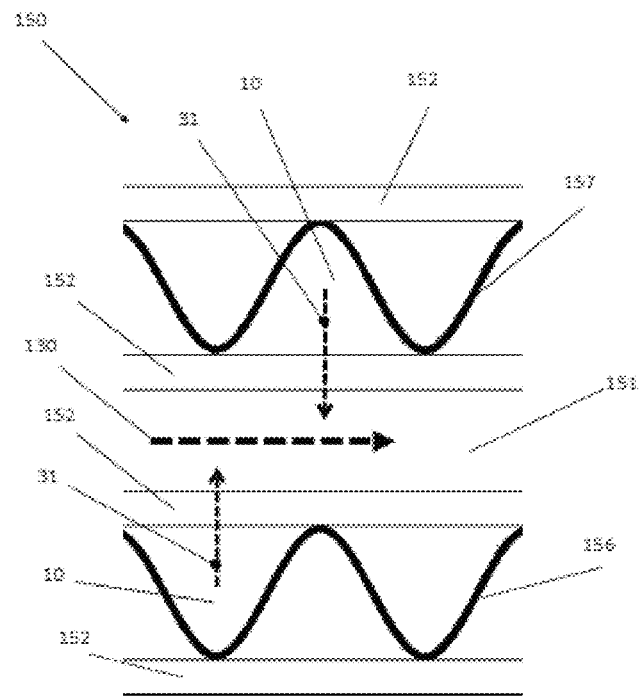
FIG. 5A is a partial cross-section illustration of one embodiment of a flow volume region within a stand-alone dehumidifying assembly.
Figure 5B:
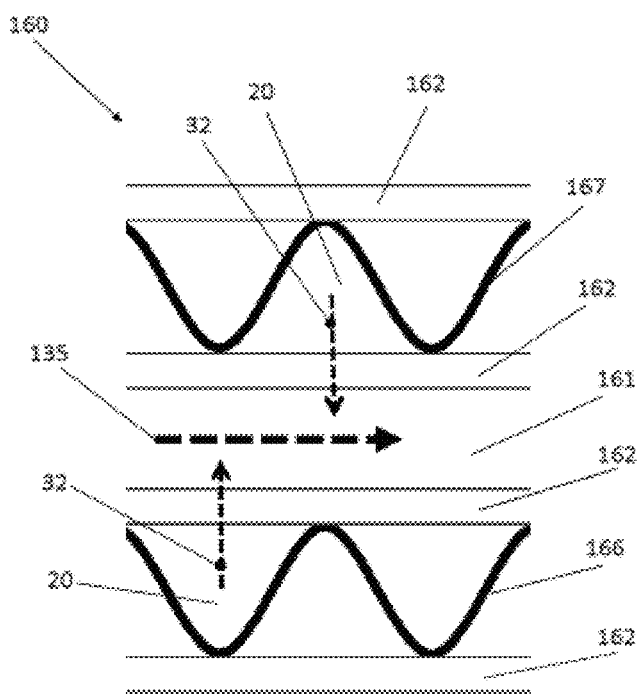
FIG. 5B is a partial cross-section illustration of one embodiment of a flow volume region within a stand-alone evaporative chiller assembly.

FIGS. 5A-5B illustrate exemplary embodiments of the invention, wherein the combined assembly 100 is separated into an individual dehumidifying assembly 150 and an individual evaporative chiller assembly 160. Depending on the requirements of the system, the ability to separate the dehumidification assembly stacks from the evaporation assembly stacks may be preferred in certain embodiments, and would also provide for separate control of latent and sensible cooling.

FIG. 5A is a cross-sectional schematic showing one embodiment of a stand-alone, i.e. independent, dehumidifying assembly 150. In this embodiment, assembly 150 is comprised of porous substrate 151, shown here in a planar (e.g., flat) configuration, adapted to receive a working fluid flow 130 (e.g., partial vacuum vapor) and first and second selectively permeable membrane 152. In the embodiment shown here, membrane 152 is a vapor permeable/gas impermeable membrane in contact with porous substrate 151. Membrane 152 has a second side configured for contact with a vapor-containing gas 10 (e.g., humid air) located within the interiorly-defined channels defined by separator plates 156, 157. In this embodiment shown in FIG. 1, first and second separator plates 156, 157 are shown in corrugated (e.g., sinuous) shape and positioned relative to membrane 152 to define one or more channels (or flow paths) for vapor-containing gas 10.

In operation, working fluid flow 130 flows through porous substrate 151 under conditions effective to pull water vapor 31 out of vapor-containing gas 10, through membrane 152 and into the vacuum plenum (e.g., porous substrate 151 and working fluid flow 130). Although the flow of working fluid 130 is illustrated with an arrow in a particular, singular direction in FIG. 5A, it is contemplated that working fluid flow 130 can be in any direction through the porous substrate dependent on the vacuum head. The vapor-depleted gas exiting assembly 150 (not shown) comprises conditioned air with a specified, controlled RH, but the temperature will remain substantially the same and can be controlled and/or monitored independent from the dehumidifier.

FIG. 5B is a cross-sectional schematic showing one embodiment of a stand-alone, or independent, evaporative chiller assembly 160. This assembly, for example, would be used for systems that require a chiller only without any dehumidification. In FIG. 5B, at least one selectively permeable membrane 162 is an evaporant permeable/liquid impermeable membrane in contact with at least one porous substrate 161. Membrane 162 is configured for contact with evaporable liquid 20 (e.g., liquid water) located within at least one flow path, which is defined by at least one separator plates (e.g., 166, 167). In this embodiment, separator plates 166, 167 are shown in corrugated (e.g., sinuous) shape. In operation, working fluid flow 135 creates a partial vacuum across the one or more membranes 162 effective to evaporate at least a portion of evaporable liquid 20 and pull evaporant 32 into porous substrate 161 and working fluid flow 135. The latent heat of evaporation in forming evaporant 32 provides cooling for the liquid exiting assembly 160 (not shown), which in turn cools the supply air.

Figure 5C:
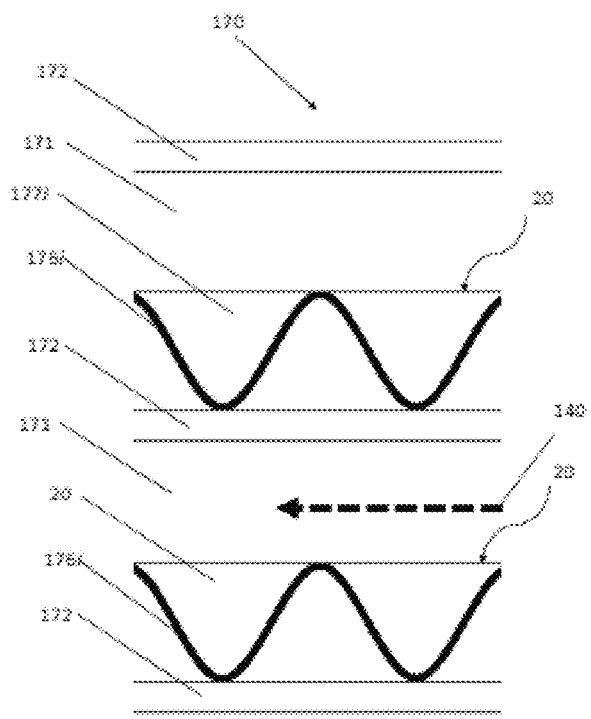
FIG. 5C is a partial cross-section illustration of one embodiment of a flow volume region within a dehumidifying and evaporative chiller assembly, wherein the flow volume region does not include a vapor/liquid selective membrane.

In still other embodiments, the vacuum-based evaporation assembly, system and method described herein is accomplished without the use of the second selectively permeable membrane. For example, FIG. 5C illustrates one additional embodiment of a combined, integrated dehumidifying and evaporative chiller assembly, wherein evaporation is achieved without the use of a selectively permeable membrane. Although in certain embodiments it might be preferred to use a second selectively permeable membrane and/or a porous substrate in between the evaporable liquid 20 (e.g. water) and working fluid flow for the evaporation step, in other alternate embodiments the use of a membrane may not be necessary and is contemplated.

FIG. 5C is one conceptual illustration of an embodiment of a dehumidifying and evaporative chiller assembly that does not include a vapor/liquid selective membrane. In this embodiment, assembly 170 would be configured similar to the assembly in FIG. 1, except assembly 170 would comprise only one selectively permeable membrane 172 (e.g., 102 in FIG. 1), which is on the vapor-containing gas side of the assembly 170. Rather than utilizing a second selectively permeable membrane, in this embodiment, evaporable liquid 20 (e.g., liquid water) is contained within the interiorly-defined channels 177i, defined by separator plates 176i, and would be in direct contact with the porous substrate 171. In exemplary embodiments of a single-membrane assembly, the assembly stacks are operatively configured and oriented so that liquid water 20 is retained within the interiorly-defined channels by virtue of gravity and the working fluid under vacuum (e.g., vacuum plenum) is maintained above the surface of the liquid 20, where the liquid reservoir is also maintained at the same vacuum pressure as the vacuum plenum. The concentration differential between the surface of the liquid water 20 and the working fluid 140 under vacuum, drives water molecules from the liquid water 20 to the working fluid 140, such that water molecules in the liquid water are evaporated and form water vapor in the working fluid. The heat of evaporation needed for this phase change is taken from the liquid water 20, thereby cooling the temperature of the liquid water (e.g., evaporative cooling).

In certain embodiments, the surface of the evaporable liquid 20 (e.g., water) is open and exposed to the working fluid flow under vacuum (e.g., vacuum plenum). In FIG. 5C, the working fluid 140 flowing through porous substrate 171 is shared by both the dehumidification and evaporative chiller assemblies. In other words, the surface of the evaporable liquid 20 (e.g., water) and first selective permeable barrier 172 are both exposed to the same vacuum plenum, and therefore the water vapor removed from the humid air and the water vapor evaporated from the liquid water 20 are pulled into a shared working fluid 140. However, in alternate embodiments (not shown), the dehumidification and evaporative chiller assemblies are separated and do not share the same working fluid. This particular embodiment could be used, for example, where it would be beneficial to separately control the dehumidification and evaporative chilling functions, so that one could turn the dehumidification portion of the system off and on, depending on the system requirements and vice versa.

In alternate embodiments, the surface of evaporable liquid 20 (e.g. water) is insulated from the first selectively permeable membrane by virtue of a barrier, wherein said barrier may comprise a second porous substrate, a membrane, or air space (e.g. void). For example, in embodiments where liquid water is pumped through the assembly, thereby causing turbulence, it may be necessary to insert a barrier between the liquid water and the porous vacuum plenum in order to avoid liquid permeation and contacting the first selectively permeable membrane with the liquid as this would render the first selectively permeable membrane (e.g., gas/vapor membrane) inoperable. More specifically, flow volume region 171 would be defined by a hydrophobic surface, wherein said hydrophobic surface is achieved through material selection or with surface coatings (e.g., Teflon®). In still other embodiments, a second porous substrate (e.g., a layer of Tyvek®) between the evaporable liquid 20 and porous substrate 171 could be used.

Figure 5D:
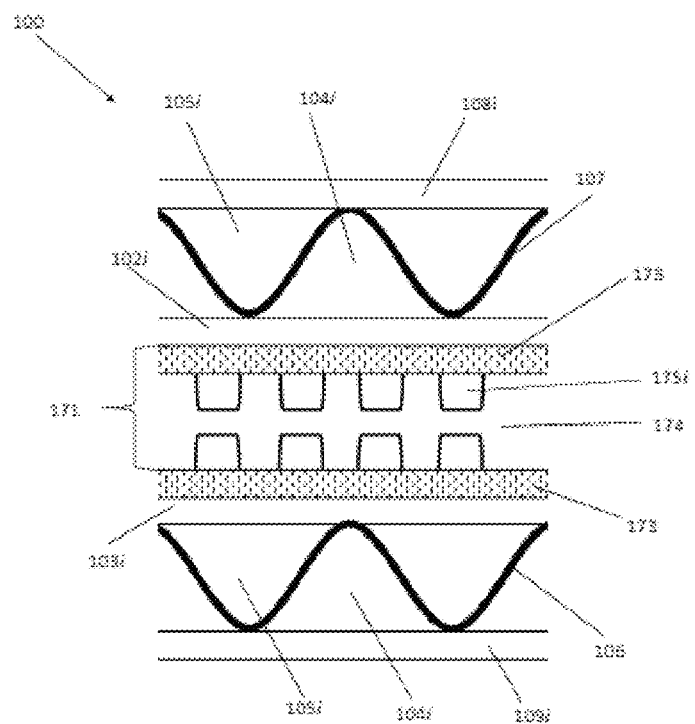
FIG. 5D depicts a partial cross-section illustration of a dehumidifying and evaporative chiller assembly additionally comprising a desiccant element.

Referring to FIG. 5D, for example, in a preferred exemplary embodiment, flow volume region 171 comprises a sandwich of thin porous material 173 (e.g., Tyvek® or a functional equivalent) and a plate 174 with gas passage enabled by perforation, or slots, or some combination of perforation and slots in the center comprising one or more interiorly-defined channels 175$i$ that enable consistent pressure throughout the plate 174. In this embodiment, at least one surface of the flow volume region 171 is operatively in contact with the evaporable liquid 20. Assembly 100 shown in FIG. 5D further comprises the same or similar components as FIG. 1, namely first separator plate 107 positioned relative to membrane surface 102$i$ to define one or more channels 104$i$, for vapor-containing gas 10; second separator plate 106 positioned relative to membrane surface 103$i$ to define one or more channels 105$i$, for evaporable liquid 20; and structures 108$i$ and 109$i$ comprise structural housing within which assembly 100 is disposed. Furthermore, although shown in FIG. 5D, in exemplary embodiments and as discussed above, it is contemplated and within the scope of this disclosure that the second selectively permeable membrane 103$i$ is optional, and can be removed.

In accordance with embodiments of the invention, FIGS. 5A-5D represent a partial view of a stacked arrangement of assemblies. In additional embodiments (not shown), multiple stacks of the assemblies shown are combined to achieve optimal latent and and/or sensible cooling within a system. The stacks can be operatively configured and incorporated into a single, compact housing or unit. In addition, the shape and configuration of the separation plates and membranes can be optimized to produce sufficient surface area that is required for the particular system and to achieve the desired results.

Example Applications

Figure 6:
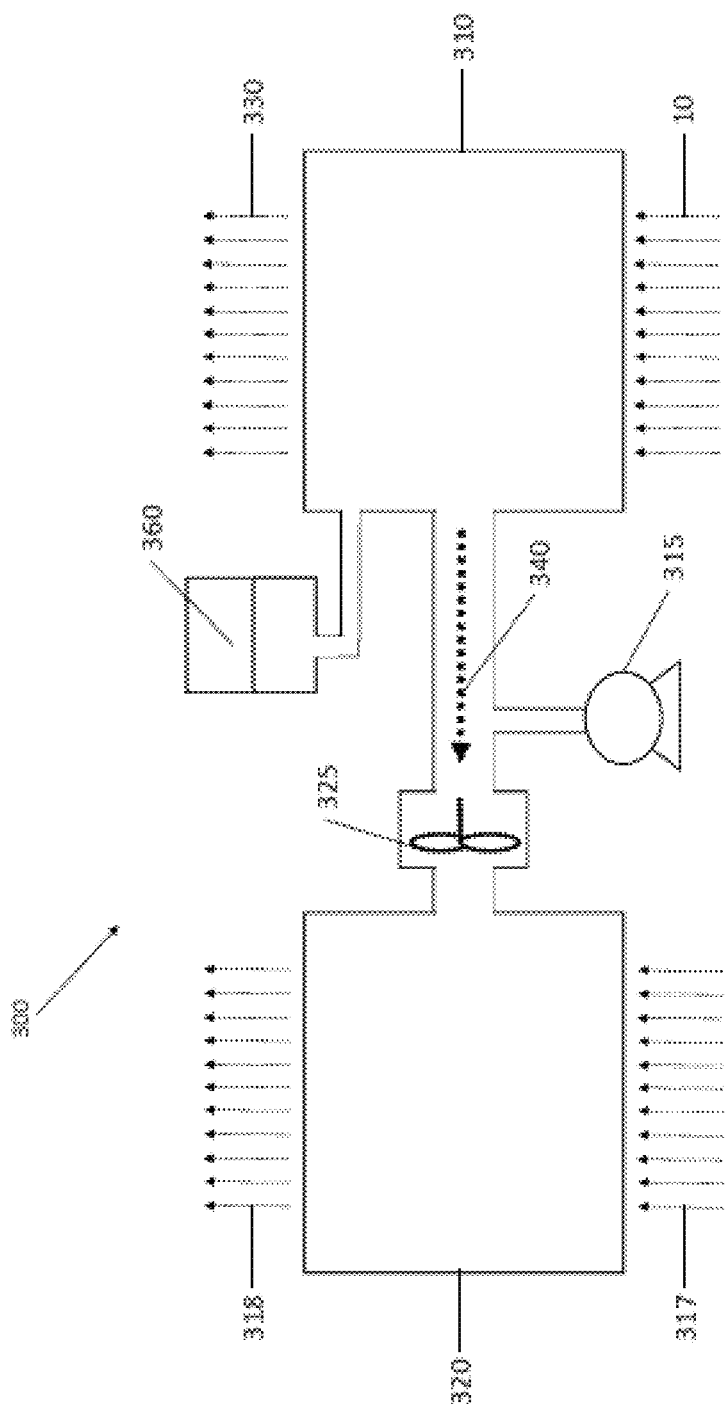
FIG. 6 is a schematic illustration of an air conditioning assembly comprising an integrated dehumidifying and evaporative chiller system employing an evaporative compressor.

One application for the systems and methods disclosed herein would be to dehumidify and cool the air in an enclosed or interior space (e.g., residential or commercial air conditioning units). The schematic for an embodiment of such a system is illustrated in FIG. 6. For convenience only and without limiting the invention, the remaining figures will be discussed in terms of the vapor-containing gas being humidified air, the evaporable liquid being liquid water, and the working fluid being partial vacuum gas.

FIG. 6 illustrates an air conditioning system 300 comprising an integrated dehumidifying and evaporative chiller apparatus 310 that incorporates the vacuum plenum technology described herein above. In system 300, apparatus 310 comprises a stack of assemblies and interiorly-defined pathways (e.g., like those described in FIGS. 1-5). In this particular embodiment, apparatus 310 is connected to a vacuum (or roughing) pump 315, water tank or reservoir 360, a fluid displacement system component, for example and as shown here, fan/pump 325, and expirator 320. Optionally, in still other embodiments, system 300 includes a waste heat device and/or one or more condensers or heat exchangers (not shown), or may include other types of fluid displacement means, as discussed in more detail herein. One of ordinary skill in the art will also recognize that the schematic in FIG. 6 omits additional components, such as connections, ducts, fittings, valves, monitors, sensors, controls, and other devices conventionally found in a cooling and/or dehumidifying system, and that are contemplated and within the scope of this invention.

In operation, when system 300 starts, vacuum pump 315 will turn on and run for a short period of time (about 30 seconds to a couple minutes) in order to initiate vacuum system 300 by removing any bleed air and drawing system 300 down to operating pressure. Once the effective operating pressure is achieved inside system 300, vacuum pump 315 can be shut off to conserve energy. Vacuum pump 315 can be selected from a variety of commercially available, known vacuum pumps (e.g., Cole Parmer). In exemplary embodiments, pump 315 will remain available for periodic purging of system 300 and to account for any leaks, and monitoring devices would optionally be present to detect the same. As used herein, the effective operating pressure is the pressure in the system required to initiate the vacuum-driven working fluid through the porous substrates in the stack at desired operating temperature. In certain embodiments, the effective operating pressure will be in the range of about 0.5 to 20 kPa, preferably about 5 kPa, and will depend on the characteristics of the system, as well as the vapor pressure of the other fluids within or exposed to the system.

Figure 7A:
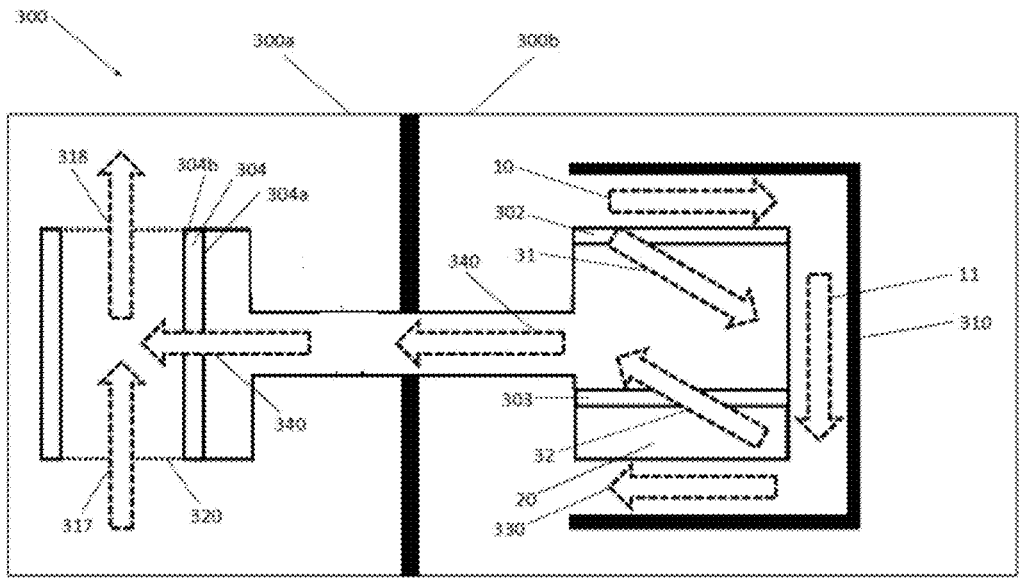
FIG. 7A is a schematic illustration of an alternate embodiment of the embodiment in FIG. 6, namely a dual-membrane dehumidifying and evaporative chiller system employing a membrane-based expirator.

FIG. 7A is a schematic illustration of the embodiment in FIG. 6 utilizing a dual-membrane dehumidifying and evaporative chiller apparatus, wherein the apparatus comprises an inside portion 300$a$ and outside portion 300$b$. Once system 300 is initiated, warm, humid air stream 10 enters apparatus 310. Dehumidification occurs, forming devaporized air stream 11, along with evaporative air cooling within apparatus 310 (see FIG. 1 and description thereof) and cooled, dried supply air exits as conditioned air stream 330. The working fluid flow 340 exiting apparatus 310 comprises water vapor 31 removed from the humid air stream 10 and water vapor 32 evaporated from the liquid water 20. For system 300 to maintain the vapor pressure differential required to hold the system under vacuum, it is necessary to remove water vapor from the working fluid vacuum stream 340 exiting apparatus 310. One way to accomplish this is by using an evaporative compressor device (e.g., a vacuum pump) to compress the working fluid to atmospheric pressure, and then condense the water vapor out of the working fluid. This embodiment is described in more detail below (see FIGS. 13A-13B). However, this type of evaporative compressor requires a high pressure ratio between the ambient air and the working fluid inside the system, which in turn makes the system not as efficient.

Another method of removing vapor from working flow 340 is illustrated in FIG. 7A. In this embodiment, system 300 is held under vacuum by using membrane-based expirator 320 to remove water vapor from the working fluid 340. As shown in FIG. 7A, expirator 320 comprises a third selectively permeable membrane 304 (e.g., water vapor permeable/air impermeable membrane). In accordance with the invention, third selectively permeable membrane 304 has a first surface 304$a$ and second surface 304$b$.

The first surface 304$a$ of the third selectively permeable membrane 304, which is on the vapor-containing working fluid side of the expirator, enables molecules of a particular vapor, e.g. water, to transfer through it, but at the same time is substantially impermeable to molecules of the gas component (e.g., $N_2$, $O_2$) of the outside air on the other side of the membrane under the conditions of operation. In one embodiment, the first selectively permeable membrane 304 is a selectively water vapor permeable/gas (e.g., $N_2$, $O_2$) impermeable membrane. In certain embodiments, the third selectively permeable membrane is comprised of one or more such membranes. Membrane 304 can be the same or different as the first and second selectively permeable membranes (302, 303) used in apparatus 310, and will depend on the characteristics and design features, and cost, of the system. Membrane thicknesses is preferably less than about 100 μm, more preferably less than about 40 μm, more preferably between about 25 μm to about 10 μm, inclusive. Without limitation, exemplary third selectively permeable membranes can be unlaminated, laminated, monolithic, or combinations thereof, and can be comprised of the non-limiting examples identified herein above as appropriate for the first selectively permeable membrane.

In operation, expirator 320 works the same way as the dehumidifying assembly described in FIG. 5A, but in the opposite direction. More specifically, the working fluid vacuum stream 340 is fed to the expirator 320, wherein expirator 320 may be configured as either a vacuum pump system or membrane-based expirator. Additionally, a fluid displacement component may be configured with expirator 320 to compresses the water vapor in stream 340, increasing the concentration of water vapor in the stream as it enters expirator 320, thereby increasing the pressure gradient between the system and the air outside the system. The vapor pressure of the working fluid 340 entering expirator 320 is higher than the partial pressure of the water vapor in the outside, ambient air 317 flowing past the second surface 304b of the third selectively permeable membrane 304. The rate of which the water vapor transfers through membrane 304 is driven by diffusion, and is dependent on the water vapor concentration differential between the working fluid inside the system 300 and the outside air. As such, water vapor molecules contained within the working fluid vacuum stream 340 will cross the first surface 304 of the vapor permeable/gas impermeable transfer membrane via diffusion and pass through to the second surface 304b of the membrane, humidify the air 317 passing by the second surface of membrane 304b, and expirate from (i.e., exit) system 300 to the outside as humidified air stream 318.

In a typical system, the ambient air 317 passing by the second surface of membrane 304b will have a vapor pressure of about 2-5 kPa, and the partial pressure of the vacuum system inside the system will be about 1-10 kPa. When fluid displacement device 325 is initiated and the water vapor within working fluid vacuum stream 340 is exposed to the atmosphere through membrane 304, fluid displacement device 325 requires a low pressure ratio sufficient for the water molecules to diffuse through the third selectively permeable membrane via a concentration gradient. Although, on a humid day, the fluid displacement component will require more energy input than it would on a less humid day because the partial water vapor pressure of the humid ambient air will be higher. In embodiments, the fluid displacement system element may comprise a vapor pump configuration wherein a desiccant wheel 391 (see FIGS. 7E and 14C, and descriptions thereof) configured with a membrane-based expirator to create conditions sufficient to permit water vapor to transfer from the working fluid through and to the other side of membrane 304.

In other embodiments and, for example, referring back to FIG. 6 (and FIGS. 13A-13B), expirator 320 comprises a vacuum pump system, wherein fluid displacement component is fan or pump 325. For example, in one embodiment, pump 325 is a device comprising a housing one or more impellers, and a motor, wherein the housing is hermetically sealed and the motor comprises a variable speed motor configured to meet the load of the system, thereby increasing the overall efficiency of system 300 by reducing the amount of energy required by pump 325. In one embodiment, for example, pump 325 is a squirrel cage fan.

In operation, pump 325 pulls the working fluid (e.g., vapor-containing gas under vacuum) stream into its center through inlet vanes; as the fluid works through the impeller blades, the kinetic energy created by the blades (or fins) accelerates the fluid (e.g., gas/water vapor) stream radially and increases the pressure of the fluid stream (e.g., compresses gas/water vapor stream 340); and then the fluid stream is released at the outlet of the pump/fan. The fluid stream exiting the fan has a higher pressure ratio (or pressure gradient) than it did when it entered the pump/fan.

In one embodiment, pump 325 comprises a variable speed pump or variable speed capabilities, the control of which can be either electronic or mechanical. In yet another embodiment, in order to maintain the requisite fan speed for system 300, pump 325 will comprise integrated speed controls that work with an automated control and monitoring/sensor system. One of ordinary skill in the art will recognize that, while shown in FIG. 6 as pump/fan 325, the fluid displacement system component can be any device or configuration optimized for lower pressure environments and capable of compressing and displacing fluid stream 340 to create a pressure ratio of at least 1.1. For example, in addition to pump 325, additional examples of fluid displacement components include other types of axial, radial or inclined fans, ring blower, gas booster, and positive displacement pumps. For example, if a higher pressure ratio is needed for system 300 (i.e., pressure ratio of 1.1 to 1.2), a compressor might be used. In alternate embodiments, there may be additional blowers or fans operatively configured with apparatus 310, for example to blow humid air from a room or building, across apparatus 310 and through its stacks.

The system shown in FIG. 7A combines sensible and latent heat removal into a single, compact dual-membrane vacuum plenum unit 310. The system does not require a separate water loop or heat exchanger to recirculate the water, thereby increasing the efficiency of the system by reducing parasitic losses. This arrangement will be appropriate under circumstances where it is preferable to expunge the water from the system rather than recirculate it, in order to increase the energy efficiency of the system. In addition, it lowers energy consumption because there is no need for an evaporative compressor, resulting in significant benefits over other prototypical membrane heat pump systems.

Figure 7B:
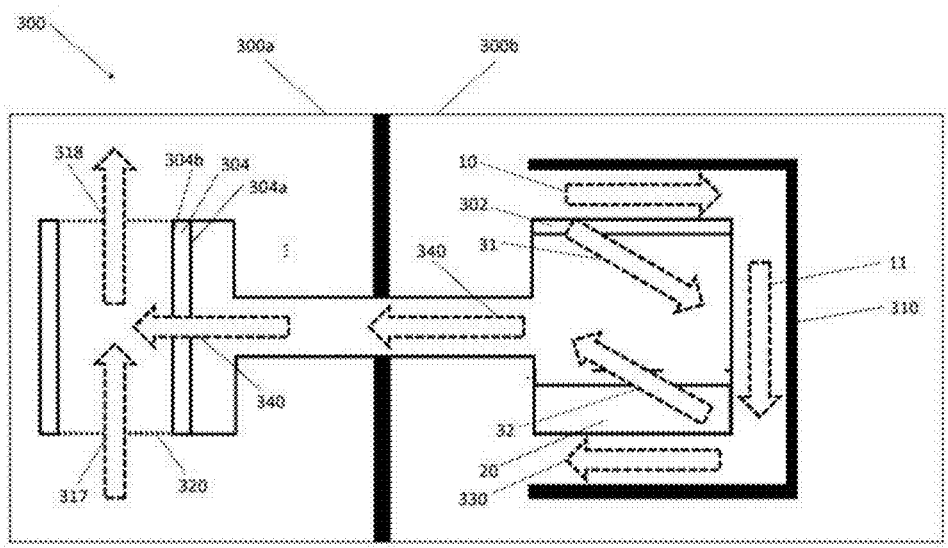
FIG. 7B is a schematic illustration of an alternate embodiment of the embodiment in FIG. 6, namely a single-membrane dehumidifying and evaporative chiller system employing a membrane-based expirator.

FIG. 7B is a schematic illustration of the embodiment in FIG. 7A utilizing a single-membrane dehumidifying and evaporative chiller apparatus. Optionally, in the alternate embodiment shown here, the latent heat removal step (e.g., evaporation) is accomplished without a selectively permeable membrane. The embodiment in FIG. 7B operates in a similar manner to that of FIG. 7A, except that second selectively permeable membrane 303 (i.e., water vapor permeable/liquid impermeable membrane) is not required. Instead, the vacuum plenum inside the dehumidifying and evaporative chiller apparatus 310 is maintained above the surface of the evaporable liquid by virtue of gravity. As shown in FIG. 7B, the pressure differential between the surface of the liquid water 20 and the working fluid 340 (e.g., gas under vacuum), drives water molecules 32 from the liquid water 20 to the working fluid 340, such that water molecules in the liquid water are evaporated and form the working fluid. The heat of vaporization needed for this phase change is taken from the liquid water 20, thereby cooling the temperature of the liquid water (e.g., evaporative cooling). In certain embodiments, as shown here, the surface of the liquid water 20 is open and exposed to the vacuum plenum or separated by a thin porous material.

Figure 7C:
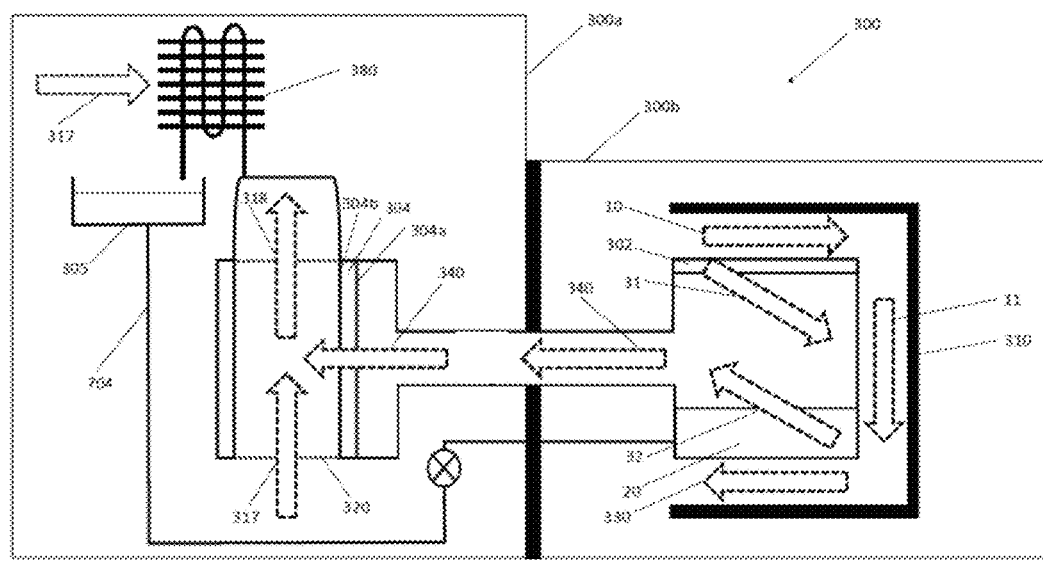
FIG. 7C is a schematic illustration of an alternate embodiment of FIG. 7B that uses a condenser.

Referring now to FIG. 7C, in certain embodiments, the vapor and evaporant in the working fluid flow 340 can be recovered, e.g. condensed and reused. The embodiment in FIG. 7C operates in a similar manner to that of FIG. 7B, except that the condensed evaporant and/or vapor exiting from system 300 is recycled back through the system and then used as the evaporable liquid 20. For example, in FIG. 7C, a water distribution system 380 is operatively configured in line with expirator 320 and vacuum plenum apparatus 310, wherein said water distribution system 380 (e.g., a condenser) uses the outside air to condense and capture the water vapor removed from system 300 to produce condensate 305 (e.g., water), and then recirculate the water 305 back to apparatus 310. This particular embodiment would be useful in areas where water is a limited resource and/or is needed for other industrial applications. One of ordinary skill in the art will recognize that the condenser 380 operatively configured with system 300 can be any condensing device known in the industry (e.g., big thermal mass, heat sink, radiator) and still remain within the scope of the invention.

Figure 7D:
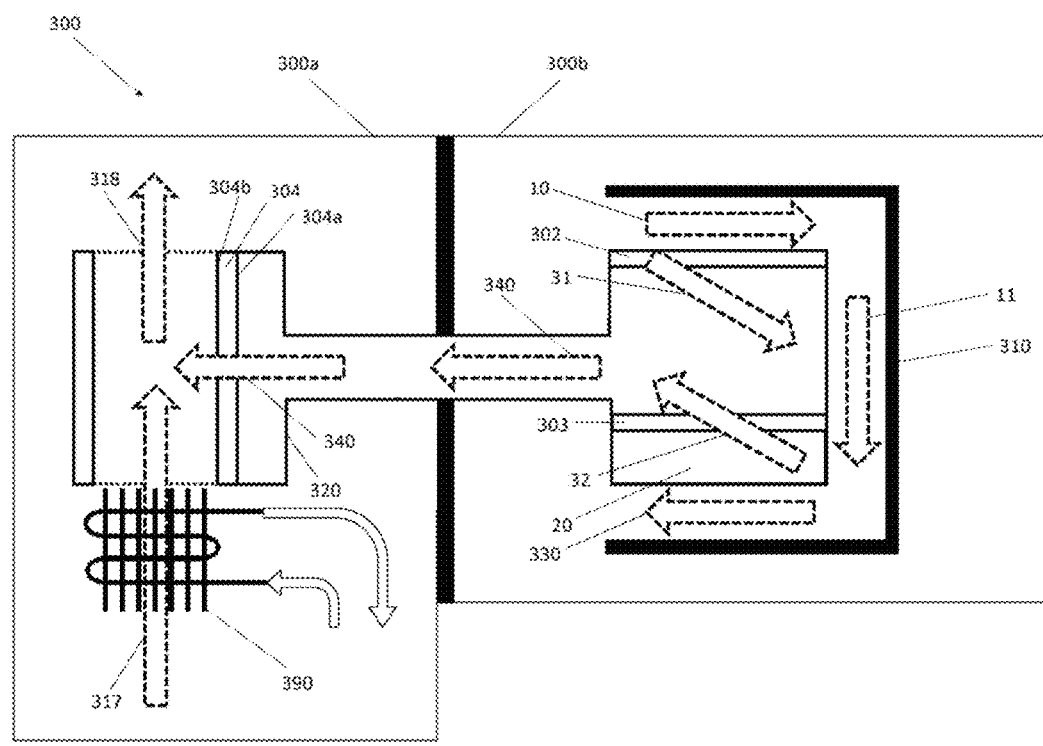
FIGS. 7D to 7E are schematic illustrations of alternate embodiments of FIG. 7A that further incorporate a waste heat element as a performance enhancement and/or a desiccant element, respectively.

FIG. 7D is a schematic illustration of an alternate embodiment that incorporates a thermally activated expirator 320 that uses waste heat captured from any industrial or natural process to improve system performance. The embodiment in FIG. 7D operates in a similar manner to that of FIG. 7A, except that it comprises waste heat enhancement device 390. In preferred embodiments, waste heat enhancement device 390 comprises a heat exchanger and/or heat wheel.

Figure 7E:
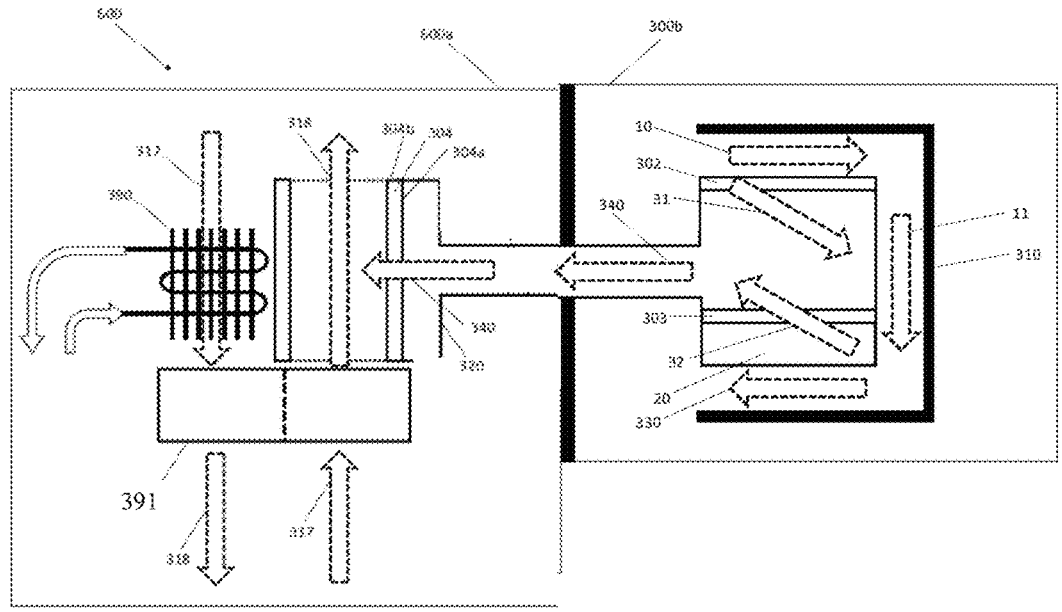

Since the rate of diffusion through the third selectively permeable membrane 304 is proportional to temperature, in this optional embodiment, the thermally activated expirator 320 uses waste heat to drive up the temperature of the ambient air 317 passing by the second surface of membrane 304. By increasing the temperature of the ambient air outside the system, it increases the amount of water that can be removed from the system (i.e. diffusion coefficient and membrane kinetics increase). Additionally, when the water partial pressure remains the same in the outside air but the saturation pressure goes up (with increased temperature), more water can be removed from the system if the pressure at surface 304a is increased by pump 325. Alternatively, if the water partial pressure in the outside air is decreased by a fluid displacement component (for example, a desiccant wheel as shown in FIG. 7E, a vacuum pump device in the vacuum plenum side of the membrane 304a is not required (see FIGS. 7E and 14A). This, in turn, allows the system to use less membranes and reduces cost. This system is possible for at least two reasons (1) the working fluid in the system is not being recycled back into the system, but rather is being expunged outside the system; and (2) heat from the thermally activated expirator will not diffuse back into the system because the expirator is only connected to the rest of the system through a pipe and the only way to deliver heat from the expirator back into the system would be by diffusion through a low density water vapor (minimal effect)

FIG. 7E is a schematic illustration of an alternate embodiment that incorporates a thermally activated expirator 320, like that in FIG. 7D, and further comprising a desiccant element 391 with regeneration. In accordance with the disclosure herein, desiccant element 391 can be a solid or liquid desiccant system. Heat can be delivered by a fluid stream connected to any industrial or natural process in which heat is generated and/or captured. Adding desiccant element 391 will provide an additional benefit of drying the outside air being used to expirate the vapor plenum by providing a larger concentration gradient of water vapor. In this configuration, a vacuum pump device is not required (see, e.g. the system shown in FIG. 14A).

Waste heat can be captured by the heat exchanger from any number of sources, including but not limited to the system 300 itself (e.g., vacuum pump, vapor pump, electronics), solar energy, geothermal energy, industrial processes. Furthermore, although not shown, thermally activated expirator 320 can be combined with a condenser (see, e.g. FIG. 7C), which would allow the system to recapture a higher percentage of water and recycle it back for use in the air conditioning system, or another system.

In embodiments of the invention, system 300 also includes a control system (not shown). In certain embodiments, control system is a microcontroller device that contains sensors and programming for monitoring ambient air temperature, relative humidity, pressure, and electrical currents and operatively configured to provide fan, vacuum pump and water delivery controls.

FIGS. 8A-8F illustrate a perspective view of a de-vaporizing (or dehumidifying) and cooling apparatus 500 in accordance with one embodiment of the invention. The specific configurations illustrated herein are merely to better define the invention and not meant to limit the invention to the apparatus described in detail herein. There are many configurations and variations for cooling apparatus 500, some of which will be described herein and some of which will not, that are within the scope of the invention as described and claimed below and all of these options are design decisions made by a practitioner skilled in the art.

FIGS. 8A-8F illustrate an embodiment wherein assembly 100 of FIG. 1, for example, comprises a plurality of assemblies 517 in a stacked arrangement, as part of a cooling and de-vaporizing apparatus 500. In accordance with a preferred exemplary embodiment of the invention, the latent heat and sensible cooling features of apparatus 500 are integrally formed components of a single, compact unit, with many features that would otherwise be fabricated as individual parts or features.

Figure 8A:
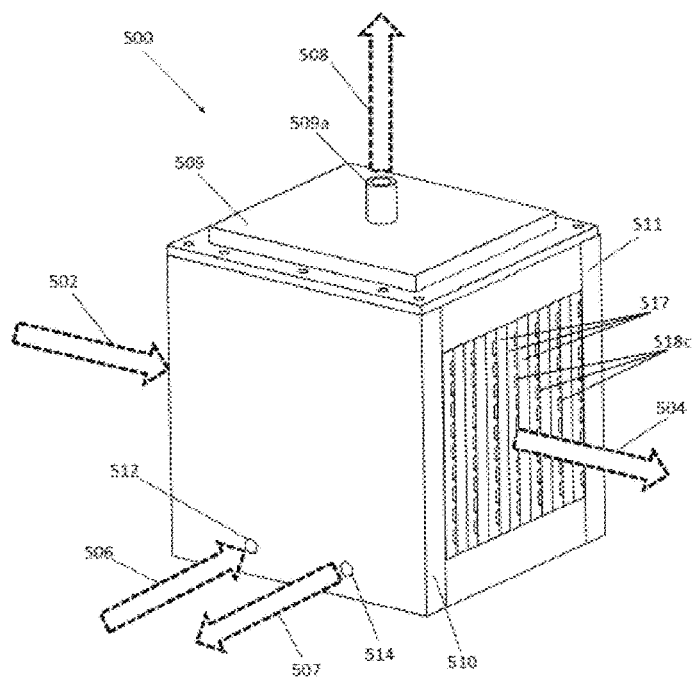
FIG. 8A is a perspective view of a membrane-based dehumidifying and chilling apparatus comprising a plurality of flow volume region assemblies in accordance with the disclosure herein.

Referring to FIG. 8A, apparatus 500 has a compression feed plate 510 and a bottom compression plate 511. Feed plate 510 has one or more inlets 512 for the working fluid feed 512a (e.g., air, vacuum). In addition, apparatus 500 has a cover plate 509 and one or more vacuum plenum working fluid outlet ports 509a for the exiting working fluid 30 as exhaust 508, which contains vapor (e.g., water vapor) that has been removed from the vapor-containing gas (e.g., humidified air) and contains evaporant from the evaporable liquid (e.g., water). Apparatus 500 has one or more air inlets (518a in FIG. 8F) for the vapor-containing gas 502 and feed plate 510 has one or more fluid inlets 512 for the evaporable liquid 506. Apparatus 500 also has one or more air outlets 518c for the vapor-depleted gas 504, which has also been cooled by the latent heat of evaporation as herein described, and one or more fluid outlets 514 for the remaining evaporable liquid 507 which has been cooled by the evaporation.

Figure 8B:
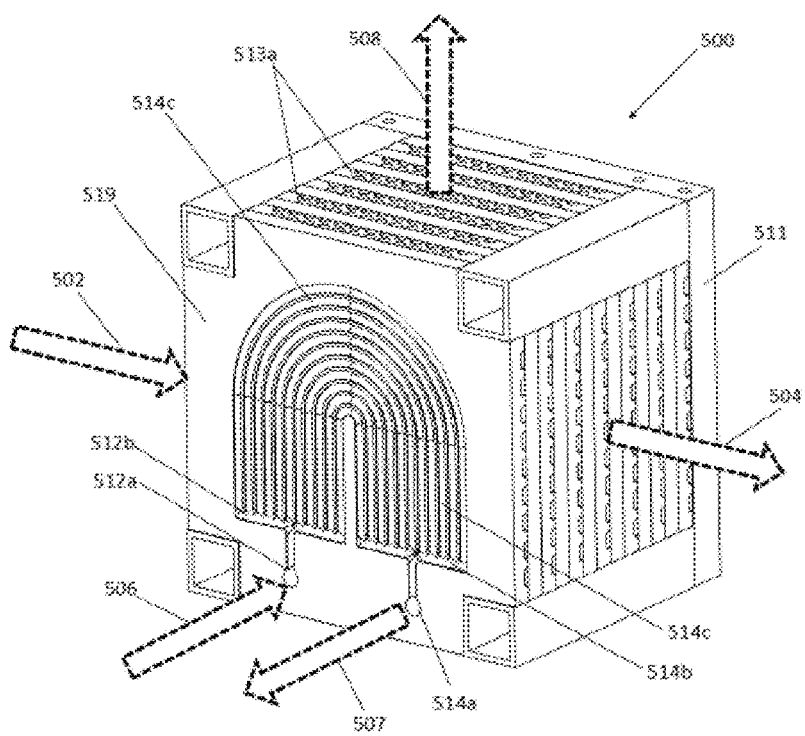
FIGS. 8B to 8G are cut-away perspective views of the various layers of the membrane-based dehumidifying and/or chilling apparatus of FIG. 8A.

FIG. 8B shows the apparatus of FIG. 8A with compression plate 510 and gasket 501 (FIG. 8G) removed, to reveal corrugated separator plate 519. In certain embodiments, the first side of separator plate 519 is in contact with gasket 501, which is in contact with the evaporable liquid 20 (e.g., water). Gasket 501 can comprise known materials suitable to the fluid environment. In a case where water channels 512b, 514b and 514c in plate 519 were not used, gasket 501 could serve to create a gap between the flat separator plates for liquid water 20 to accumulate and enter from the header inlets 512 (see, e.g. FIG. 8G). It should be understood that, while gaskets are referred to throughout the description that follows herein for FIGS. 8A-8G, the use of gaskets are optional. For example, in alternate embodiment, with the exception of the air inlets, air outlets, water inlets and water outlets, apparatus 500 is hermetically sealed and preferably air tight by sealing each layer against the previous layer without the use of gaskets.

Referring again to FIG. 8B, in this particular, non-limiting embodiment, the visible side of separator plate 519 has one or more interiorly-defined channels 514c that direct the flow paths (105i in FIG. 1) of the evaporable liquid (e.g., water) from separator plate inlet 512a, through manifold 512b, channels 514c and manifold 514b to separator plate outlet 514a. The second (or back) side of separator plate 519 (shown in FIG. 8F) is not in contact with evaporable fluid 20, but rather defines the air inlets 518a, air flow channels 518b and air outlets 518c, as depicted in FIG. 8F.

Operationally, referring to FIG. 8B, water 506 that has entered the apparatus of FIG. 8A and flowed through interiorly-defined channel and separator plate inlet 512a, now flows through separator plate interiorly-defined manifolds and channels, 512b, 514c, and 514c, and across evaporant-permeable/liquid-impermeable (liquid-side) membrane 521 before exiting via and interiorly-defined channel and separator plate outlet 514a. Under partial vacuum, the flow of working fluid 30 in the porous substrate 523 (FIG. 8E) creates conditions that allow at least a portion of the water 20 to be evaporated through membrane 521 and into porous substrate (similar to 101 in FIG. 1). This cools the remaining water 507 that ultimately exits apparatus 500 through interiorly-defined channels 514a. This cooled water 507 provides heat exchange to provide sensible cooling for the dehumidified air 504.

Figure 8C:
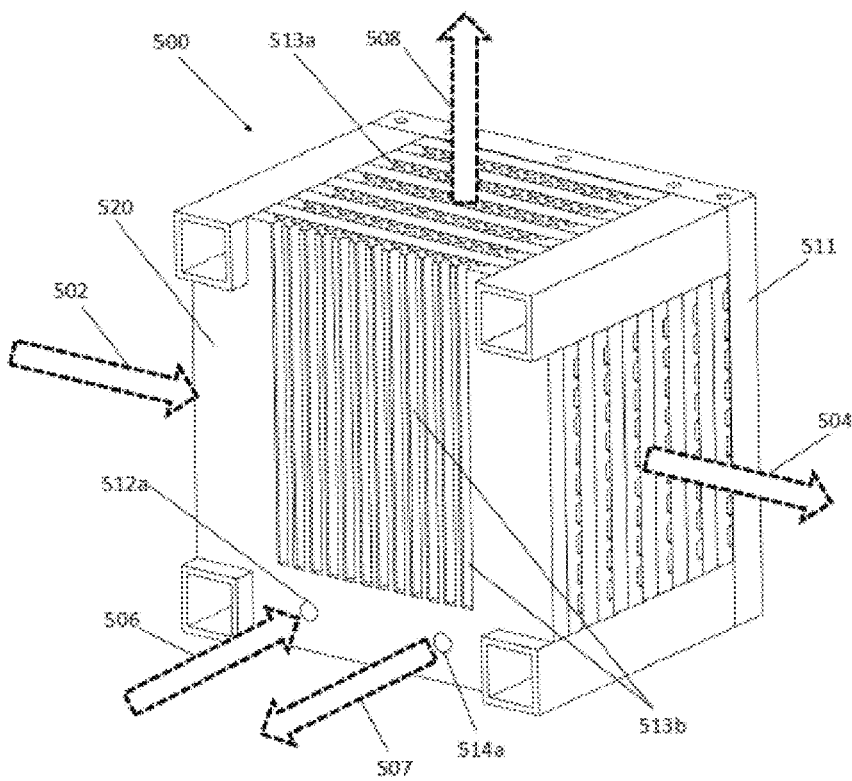

FIG. 8C shows the apparatus of FIG. 8B with separator plate 519 (FIG. 8B), air side membrane 525 (FIG. 8D) and porous substrate 523 (FIG. 8E) removed. FIG. 8C depicts the working fluid channel plate 520, which has interiorly-defined vacuum channels 513b, through which the working fluid 30 (FIG. 1) may flow and exit via working fluid channel outlets 513a.

Figure 8D:
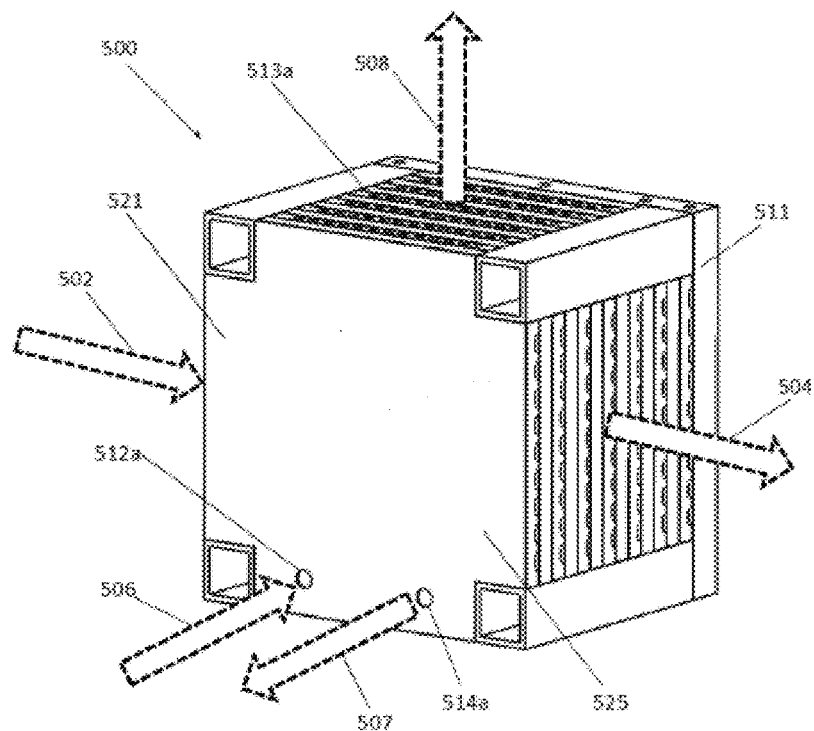
Figure 8E:
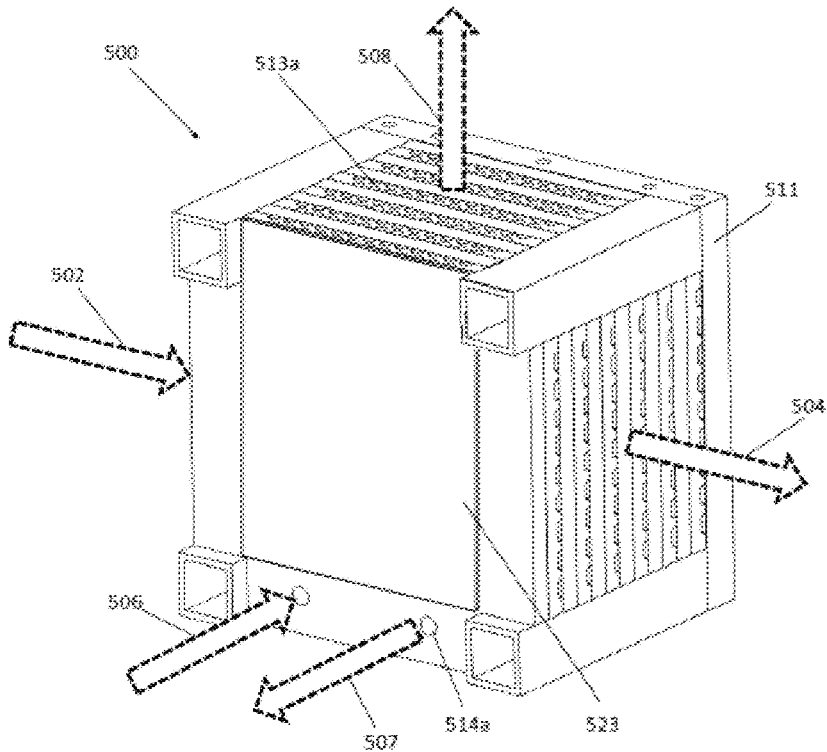
Figure 8F:
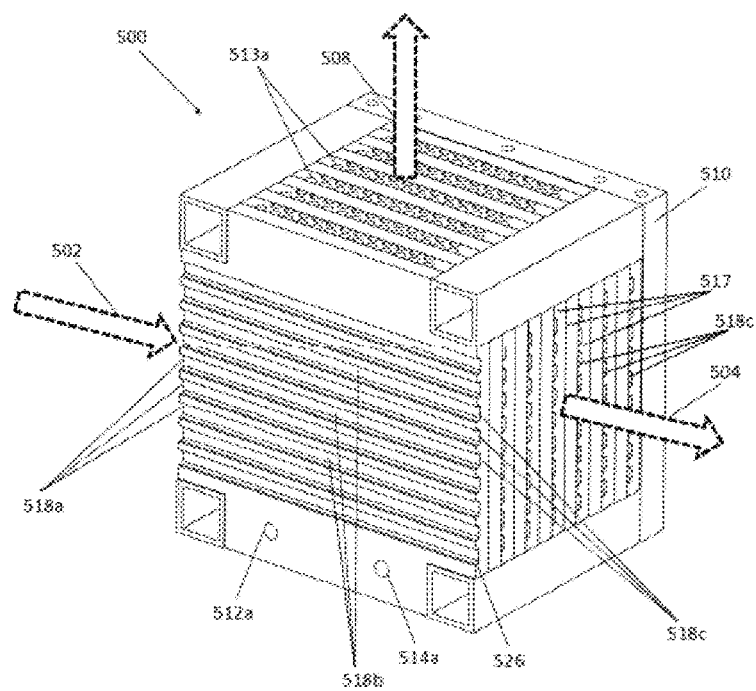

FIG. 8D depicts the evaporant permeable/liquid impermeable (liquid-side) membrane 521 (i.e., 103 in FIG. 1). FIG. 8E depicts the porous substrate 523, in particular the surface of the porous substrate (i.e., 101b in FIG. 1) that is in mass transfer relationship with the liquid side membrane 521 depicted in FIG. 8D.

Operationally, a partial vacuum is applied to air 502 and fluid 506 entering the apparatus 500. The partial vacuum is pulled through the interiorly-defined vacuum channels 513b and channel outlets 513a of the working fluid channel plate 520 (FIG. 8C), across the porous substrate 523 and water vapor (i.e., evaporant) permeable membrane 521, resulting in evaporation of a portion of the liquid water (20) into the porous substrate, and also across the air side membrane (not shown), pulling water vapor (31) into the vacuum channels 513b and thereby dehumidifying the air (10). Under partial vacuum, evaporated water (32) from the liquid water (20) and water vapor (31) from the humid air (10) enter the porous substrate 523 to comprise the working fluid (30), which exits the porous substrate 523 via the interiorly-defined vacuum channels 513b, and ultimately exits the apparatus via the vacuum channel outlets 513a.

FIG. 8F shows the apparatus of FIG. 8E with the porous substrate 523 and water vapor permeable/gas impermeable membrane 525 removed, wherein water vapor permeable/gas impermeable (air-side) membrane 525 (analogous to membrane 625 in FIG. 10) is in mass transfer relationship with the porous substrate 523, and also shows a second separator plate 526 (similar to 519 in FIG. 8B and to separator plate 107 of FIG. 1).

Figure 8G:
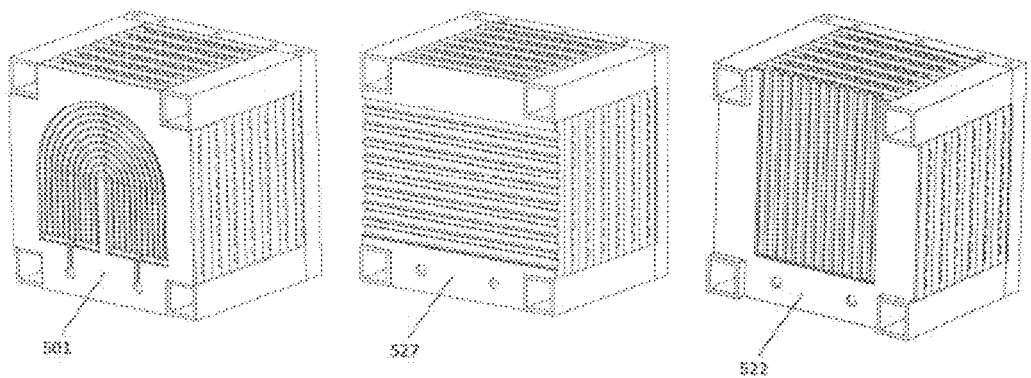

Separator plate 526 is configured to be in contact with the humidified air (10), along with air side gasket 527, which can comprise known materials suitable to the fluid environment. In certain embodiments, if channels 518c were not in plate 526, gaskets 527 could be used to support a gap between the plates to provide air flow (see, e.g. FIG. 8G). In FIG. 8F, separator plate 526 is shown in corrugated shape defining flow paths 518b (similar to 104i of FIG. 1) for the air. Operationally, in FIG. 8F, humidified air 502 that entered apparatus 500 of FIG. 8A and flowed through interiorly-defined channels 518 now flows over the air side membrane 525 under conditions effective to pull water vapor (31) out of the humidified air, which water vapor (31) then crosses over membrane 525 into the porous substrate 523 to partially comprise the working fluid (30) and ultimately the exhaust 508. The resulting dehumidified air 504 is provided sensible cooling by heat exchange through the assembly itself with the remaining water 507 that which has been cooled by evaporation. FIG. 8G shows the various gaskets referenced throughout FIGS. 8A-8F, including 501, 527 and 522.

Figure 9:
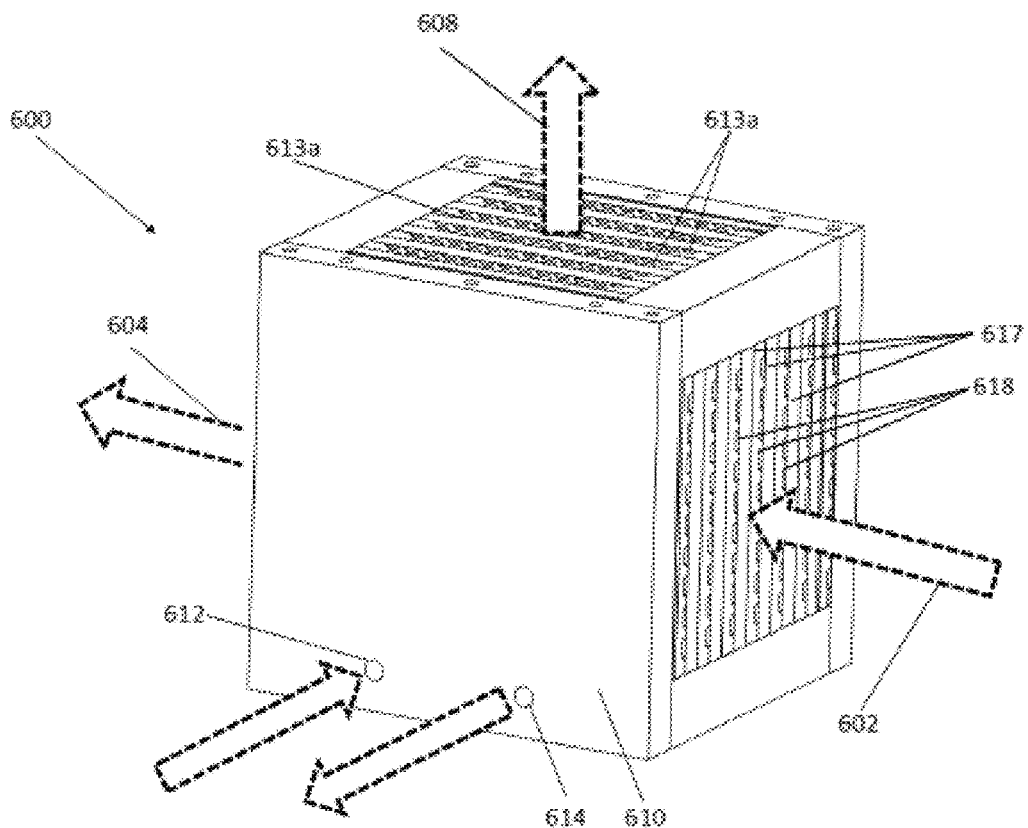
FIG. 9 is a perspective view in accordance with another embodiment of a membrane-based dehumidifying and/or chilling apparatus.

FIG. 9 illustrates apparatus 600, another embodiment of the invention. Apparatus 600 comprises a plurality of assemblies 617 disposed in a stacked arrangement as shown. The assemblies 617 can be along the general design of that show in FIGS. 1-5. The apparatus 600 comprises a compression plate 610 having liquid water inlet 612; vacuum plenum working fluid outlets 613a; and outlet 614 for venting or controlling pressure of liquid water from which evaporant has been extracted exiting the apparatus. The exhaust fluid 608 exiting vacuum plenum working fluid outlets 613a will include water vapor (31) removed from humid air (10) and water vapor (32) evaporated from the liquid water (20). In the embodiment shown in FIG. 15, and as depicted by arrow 602, the humidified air (10) that is to be conditioned flows directly through the stacked assemblies via air flow pathways (or channels) 618b (analogous to 518b in FIG. 8F), wherein air flow pathways 618b are on the water vapor permeable/gas impermeable membrane (see 104 in FIG. 1). As depicted by arrow 604, dehumidified air flows out the opposite side of the stack, and the air has also been cooled by heat exchange as occurs within the stacks via the latent heat of vaporization attendant the evaporation side.

Figure 10A:
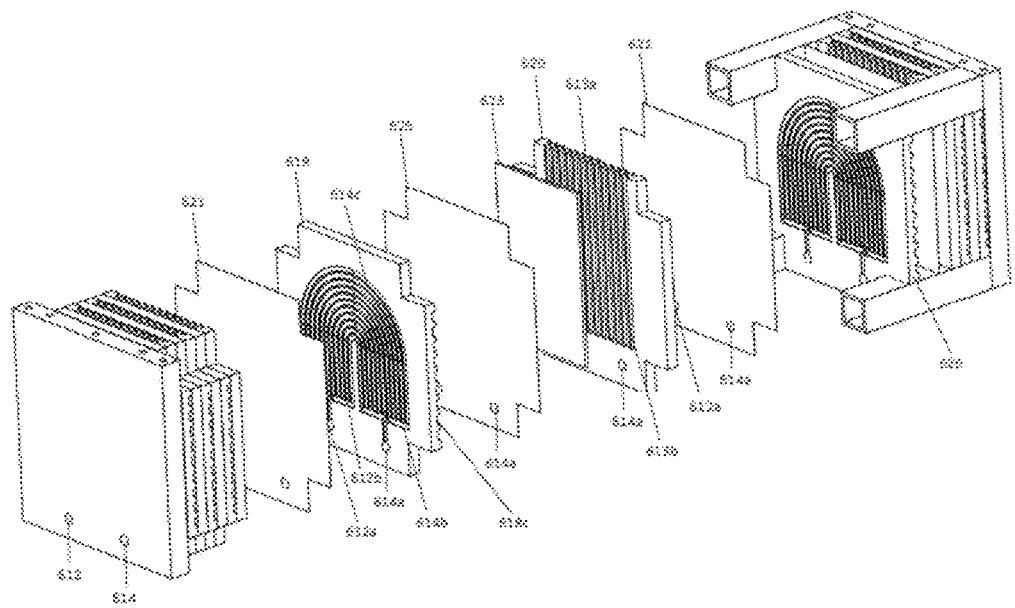
FIG. 10A is a partially exploded perspective view of the membrane-based dehumidifying and/or chilling apparatus of FIG. 9.
Figure 10B:
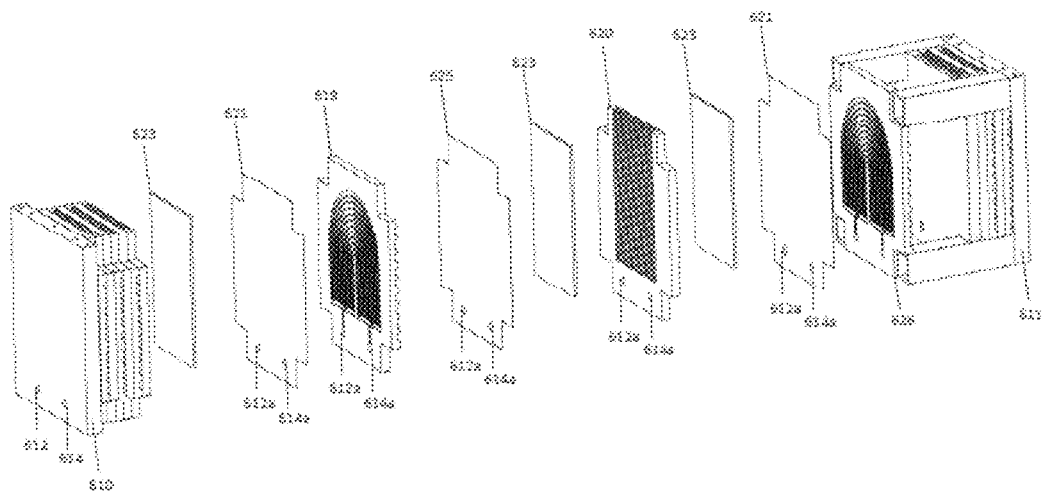
FIG. 10B is a partially exploded perspective view of an alternative configuration of the membrane-based dehumidifying and/or chilling apparatus depicted in FIG. 9.

FIG. 10A is a partial exploded view showing various internals of the apparatus of FIG. 9. Separator plate 619 has interiorly-defined feed water channel 612a which extends through the stack of assemblies, and 614b, 614c, and 612b which provide water flow paths over and across plate 619 to interiorly-defined exit water channel 614a. Plate 619 has corrugations on both sides, including air flow channels 618. 613b represents interiorly-defined partial vacuum fluid channels, the partial vacuum working fluid, e.g., containing water vapor from the humidified air (10) and as evaporated from the liquid water (20).

Separator plate 619, including the air flow channels 618 and air flow outlets 618c, is in contact with air side membrane 625, which is further in mass transfer relationship with porous substrate 623. Porous substrate 623 may further be in mass transfer relationship with a water-side membrane 621, which is also in contact with plate 619 and the water channels, 614*b*, 614*c*, and 612*b*. Or, porous substrate 623, may be in direct contact with the water channels, 614*b*, 614*c*, and 612*b*. Separator plate 626 is analogous to separator plate 526 in FIG. 8F. FIG. 10A is a partial exploded view showing various internals of the apparatus of FIG. 9, showing an alternative configuration of components to those included in FIG. 10A.

Figure 11:
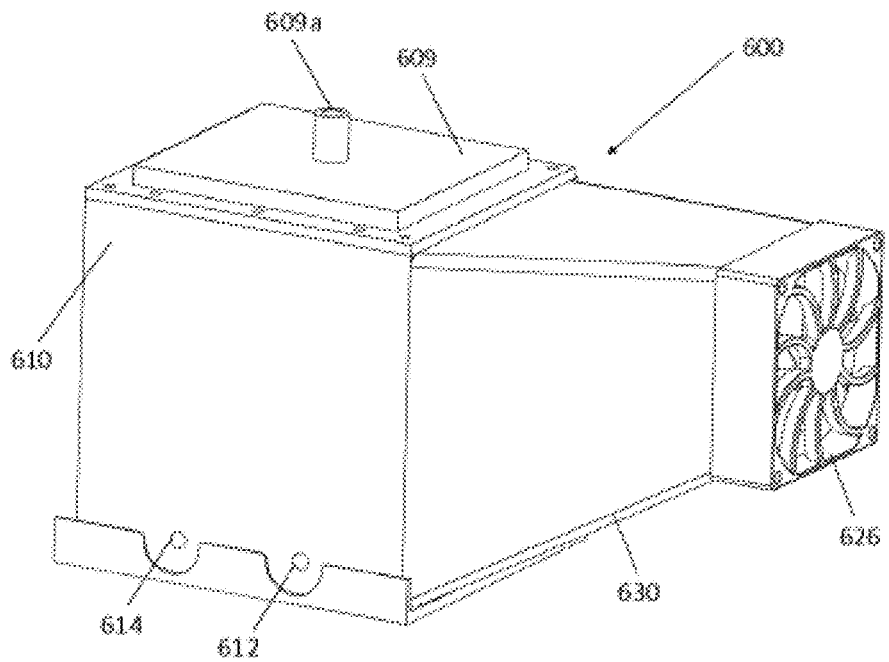
FIG. 11 depicts the dehumidifying and/or chilling apparatus of FIG. 10 as part of an HVAC system.
Figure 12:
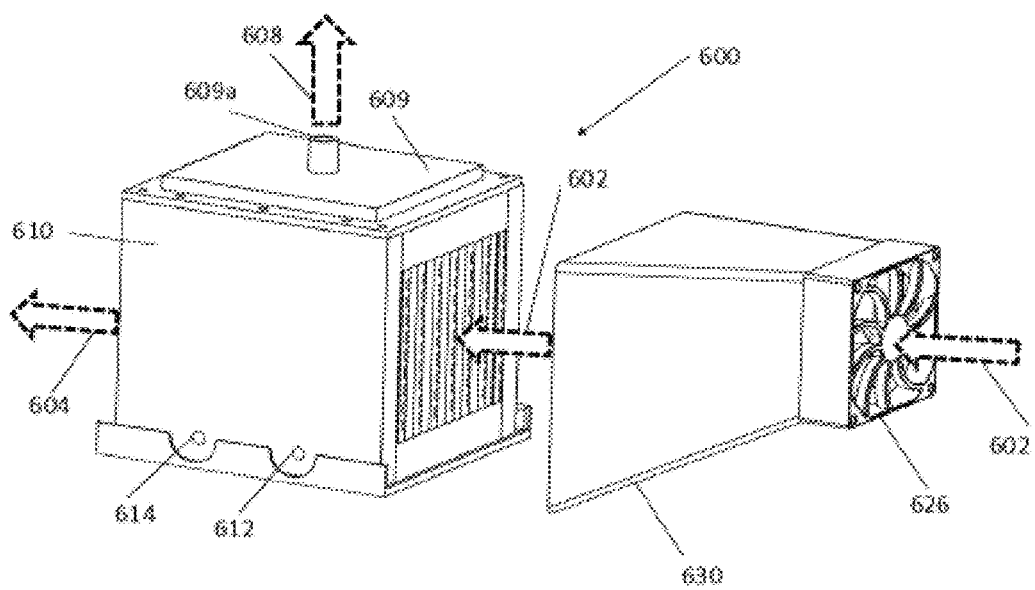
FIG. 12 is a partially exploded view of FIG. 11.

FIG. 11 and FIG. 12 show the embodiment of the apparatus of FIG. 9 in one application. Apparatus 600 is connected in series to duct work 630 which is in flow communication with fluid displacement device 626. The fluid displacement device blows air 602, e.g. from a room or building, across apparatus 600 and through the stacks via air flow pathways 618. Dehumidification and sensible air cooling occurs within the apparatus and the cooled, dried air exits as 604. Further, the outflow of the working fluid (e.g., water vapor under partial vacuum) through the vacuum plenum working fluid outlets 613*a*, may be collected by a cover plate 609 and funneled through a vacuum plenum working fluid outlet port 609*a*.

Figure 13A:
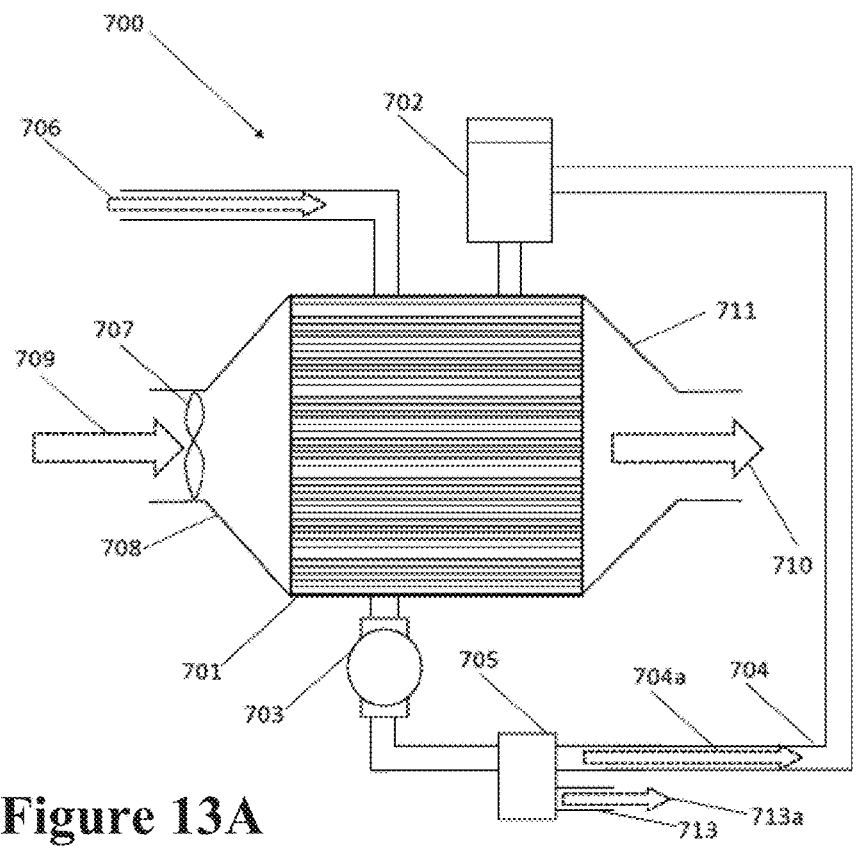
FIG. 13A is a schematic illustration of an HVAC system in accordance with one embodiment of a membrane-based dehumidifying and evaporative chiller apparatus.

FIG. 13A shows yet another embodiment of a membrane-based vacuum plenum dehumidification/cooling system with a vacuum pump, instead of an expirator. The system shown here can be either a single or dual-based membrane system. The system 700 has an apparatus 701 comprising a stack of assemblies and interiorly-defined pathways as described. Water is fed to the apparatus 701 from reservoir 702. Upon start up, the vacuum plenum, as working fluid through porous substrates in the stack, is initially provided by vacuum pump 703 and bleed air (e.g., outside air) 706. Pump 703 is also provided with a condensate return 704 for evaporant formed from the liquid water feed and water vapor pulled from the air, and liquid water separator (e.g., a coalescing filter) 705. The condensed water can be recovered for other uses, including recycle to the reservoir via 704*a* (e.g., as condensate return).

Fluid displacement device 707 (e.g., a fan) feeds humidified air 709 from e.g., an enclosed space such as a room or building, and blows the air through the assembly wherein it is dehumidified and cooled, exiting as such, 710, via ductwork 708 and 711. The cooled and dehumidified air 710 can be returned to the enclosed space or elsewhere as supply air.

Figure 13B:
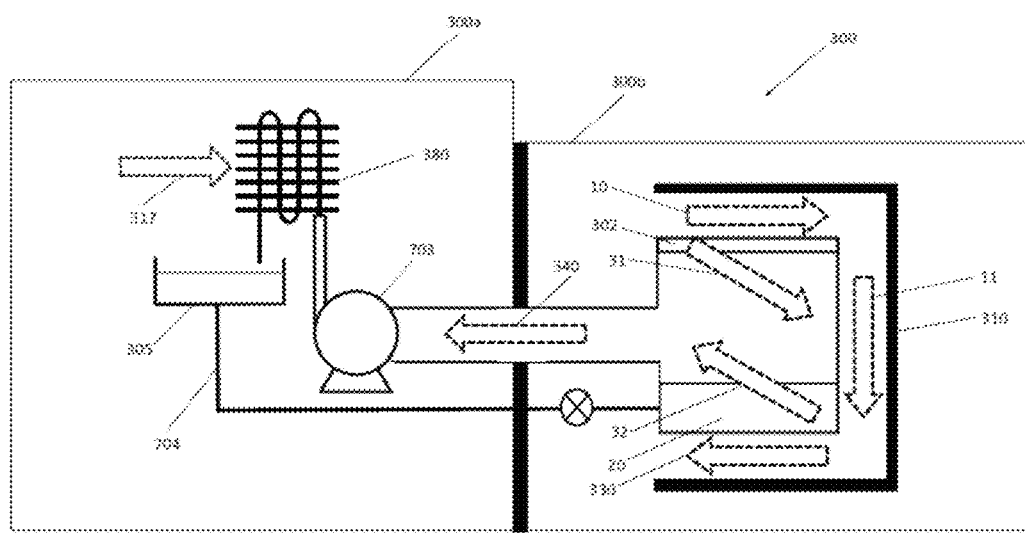
FIG. 13B depicts one embodiment of the system in FIG. 13A utilizing a single-membrane dehumidifying and evaporative chiller apparatus.

As shown in FIG. 13B, one embodiment of the system in FIG. 13A can use a single-membrane dehumidification/cooling system with a vacuum pump 703, instead of an expirator. Yet another embodiment (not shown) will use a dual-membrane system.

Figure 14A:
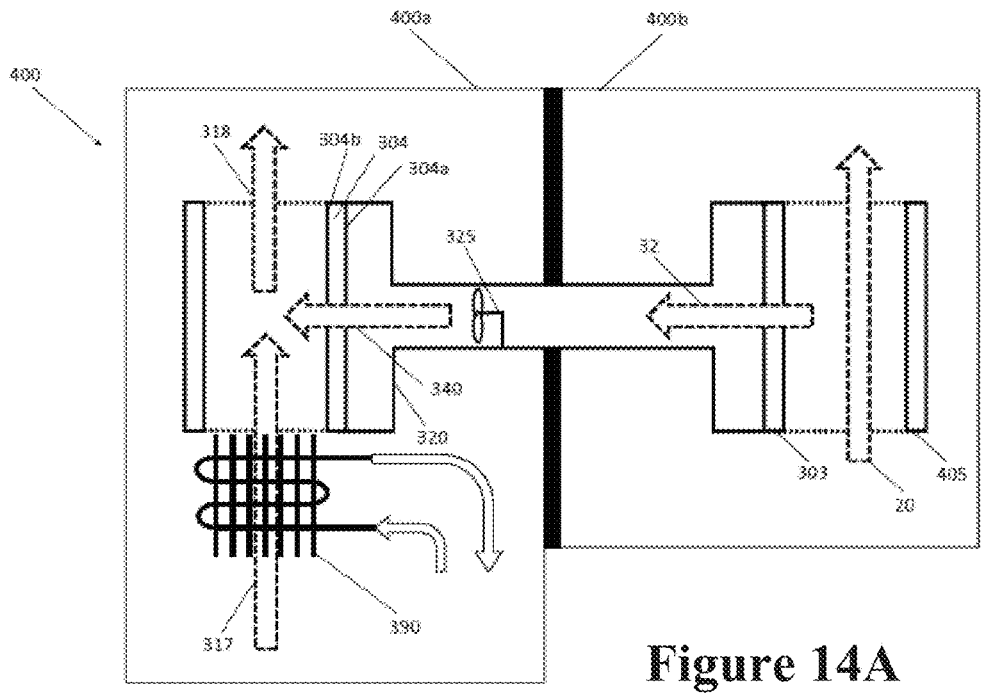
FIGS. 14A to 14C are schematic illustrations of embodiments of a vacuum plenum system in accordance with the disclosure herein.
Figure 14B:
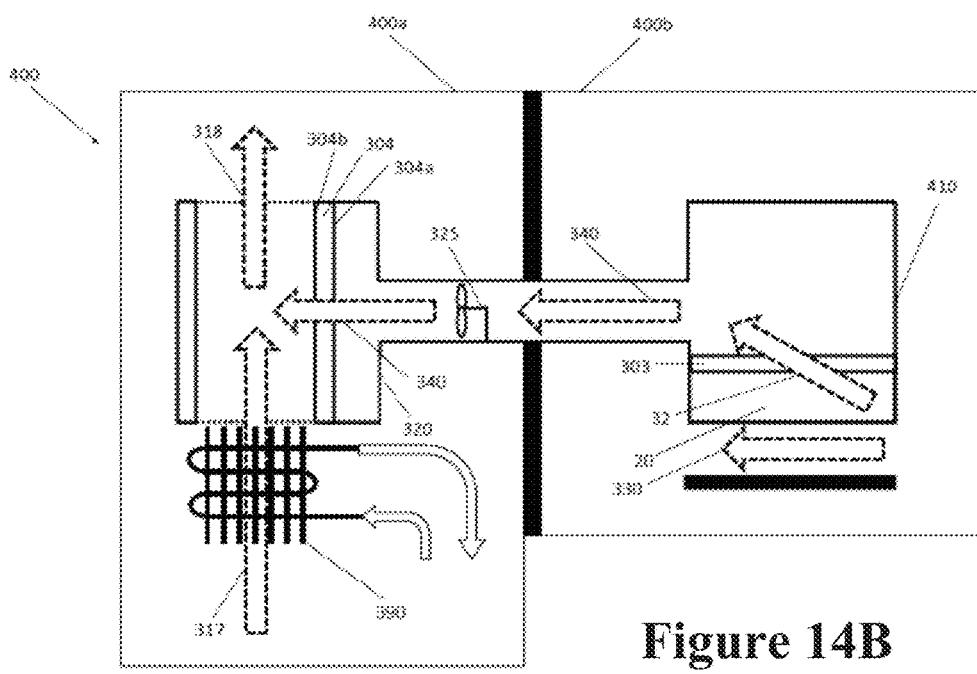
Figure 14C:
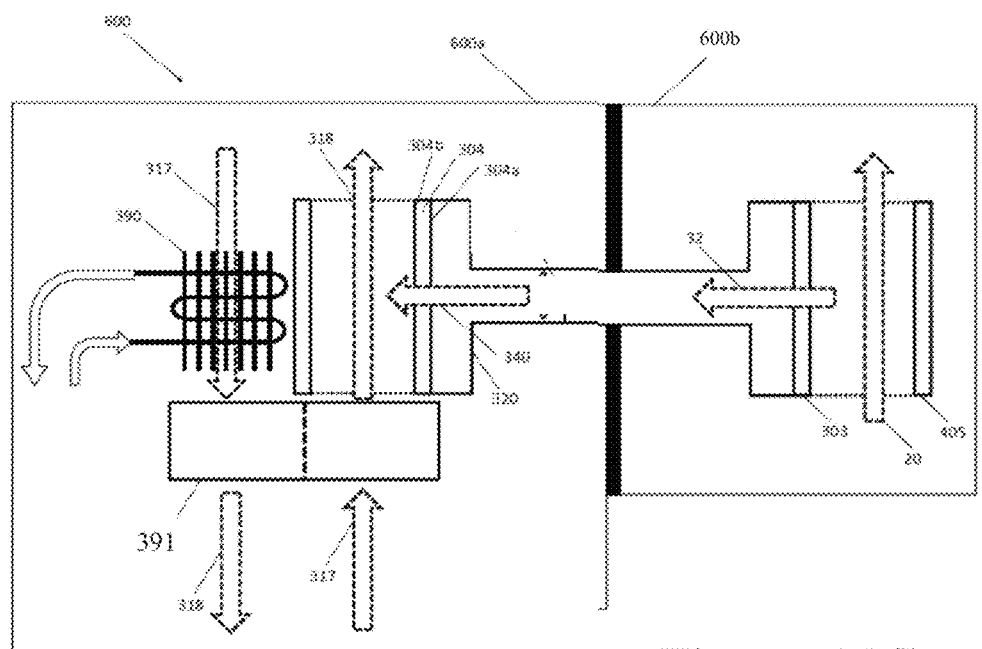

The methods and systems cited above can be suitable for both large and small heat pump and air conditioning applications. In addition, and as described above, the methods can be used individually as a chiller, dehumidifier, or as a combined dehumidifier and cooling system. In addition, the methods disclosed herein can utilize one, two or three membranes. For example, FIGS. 14A-14B are embodiments of a vacuum plenum system 400 that incorporates an expirator and chiller only. FIG. 14A is similar to that described in FIG. 7A, except that apparatus 405 is a chiller only (sensible heat) and does not perform any dehumidification. FIG. 14B is similar to the system described in FIG. 14A, except that apparatus 410 does not use any membranes. Instead, the vacuum plenum inside the evaporative chiller apparatus 410 is maintained above the surface of the evaporable liquid 20 by virtue of gravity. In FIG. 14C, vacuum plenum system 600 further comprises desiccant element 391. One of ordinary skill in the art will readily appreciate that any of the systems illustrated in FIGS. 14A-14C could also include one or more of a waste heat performance enhancement device, one or more fluid displacement components and/or condenser element.

Various embodiments and modifications of this invention have been described in the foregoing description. The preferred embodiments disclosed above have several features, no single one of which is solely responsible for their desirable attributes. Such embodiments and modifications are illustrative only and are not to be taken as limiting in any way the scope of the invention, which is defined by the following claims. Not all of the features disclosed are necessary to achieve the advantages of the methods or system and, therefore, none of the features should be viewed as limiting. Similarly, the above brief description of various embodiments of the present disclosure is not intended to describe each embodiment or every implementation of the present disclosure. Rather, a more complete understanding of the disclosure will become apparent and appreciated by reference to the description and claims in view of the accompanying drawings, and will provide an understanding how the features of the preferred embodiments provide advantages over prior art systems and devices. However, other variations of what has been described also fall within the scope of the invention, and the present invention may be modified and practiced in different but equivalent manners apparent to those skilled in the art having the benefit of the teachings herein. Further, it is to be understood that other embodiments may be used and structural changes may be made without departing from the scope of the present disclosure.

Throughout this disclosure and examples, periodically there will be process or component designators, such as "$102_i$," or "$104_i$,", and it is the intent that these variables represent that it is contemplated one or more of the structural elements may be contained within the structure illustrated in a context appropriate manner, unless otherwise specified in the text. As an example, at several points throughout the embodiments of the present invention, the use of a variable such as "$102_i$," and $104_i$ is intended as a non-limiting representation regarding the number of membranes and/or flow paths that might be used within a particular assembly, and is for the purpose of illustration only.

All numbers and ranges disclosed above may vary by some amount. Also, the terms in the claims shall have their plain, ordinary meaning unless otherwise explicitly and clearly defined by the patentee. Subject matter incorporated by reference is not considered to be an alternative to any claim limitations, unless otherwise explicitly indicated.

What is claimed is:

1. A vapor-removing and cooling system comprising:
   a) a plurality of vapor-removing and cooling assemblies disposed in a stacked arrangement and wherein:
      said vapor-removing assemblies comprise a flow volume region having a first surface and a second surface, the flow volume region adapted to receive a first working fluid flow under partial vacuum; a first selectively water vapor permeable membrane having a first side in mass transfer relationship with the first surface of the flow volume region and having a second side configured for contact with a water vapor-containing gas to permit transfer of at least a portion of the water vapor from the water vapor-containing gas through the first selectively water vapor permeable membrane and into the first working fluid flow; and
      said cooling assemblies having a mass transfer relationship between a second working fluid flow and an evaporable liquid to provide formation of an evaporant from the evaporable liquid and permit transfer of at least a portion of the evaporant from the liquid into the second working fluid flow, wherein the mass transfer relationship between the second working fluid flow and the evaporable liquid comprises a barrier for maintaining the second working fluid flow above a first surface of the evaporable liquid to permit formation of an evaporant from the evaporable liquid and transfer of at least a portion of the evaporant into the second working fluid flow;

b) interiorly-defined channels providing separate flow paths for the vapor-containing gas, the evaporable liquid, and the first and second working fluids, the interiorly-defined channels in fluid communication with the plurality of vapor-removing and cooling assemblies;

c) one or more inlets in fluid communication with the interiorly-defined channels; and d) one or more outlets in fluid communication with the interiorly-defined channels.

2. The system of claim 1 wherein the mass transfer relationship between the second working fluid flow and the evaporable liquid comprises: a second selectively permeable membrane, the second selectively permeable membrane having a first side in mass transfer relationship with a second surface of the at least one flow volume region, and having a second side configured for contact with an evaporable liquid to permit formation of an evaporant from the evaporable liquid and permit transfer of at least a portion of the evaporant through the second selectively permeable membrane and into the second working fluid flow.

3. The system of claim 1 wherein the barrier comprises a porous substrate, a selectively permeable membrane, a hydrophobic material, or a void.

4. The system of claim 1 wherein the mass transfer relationship between the second working fluid flow and the evaporable liquid comprises at least one surface of the at least one flow volume region operatively in contact with at least one surface of the evaporable liquid.

5. The system of claim 1 wherein the plurality of vapor-removing and cooling assemblies are integrally formed components of a single, compact unit.

6. The system of claim 1 wherein the first and second working fluid flows are physically separated.

7. The system of claim 6 wherein the vapor-removing and cooling assemblies are separately controlled and can be operated independently of one another.

8. The system of claim 1 further comprising an expirator for maintaining the apparatus under partial vacuum, wherein said expirator is selected from the group comprising a membrane-based expirator and a vacuum pump system.

9. The system of claim 8, wherein the expirator comprises:

at least one third selectively permeable membrane having a first side in mass transfer relationship with a third working fluid and;

is operatively configured with a fluid displacement system component, wherein said fluid displacement system component creates conditions sufficient to permit water vapor to transfer from the third working fluid through the third selectively permeable membrane to a second side of the third membrane, and said fluid displacement system component is selected from the group comprising a vapor pump, a fan, a blower, a desiccant wheel and combinations thereof.

10. The system of claim 9 wherein the at least one first, second and third selectively permeable membranes are selected from the group comprising a microporous PTFE membrane, a perfluorosulfonate ionomer membrane, a PTFE/PAO/PU membrane, a PTFE/PAO/PU laminate, a polyester/polyether membrane, a polyester/polyether laminate, a derivatized cellophane membrane, a chemical protective laminate, flashspun high-density polyethylene fiber paper, flashspun high-density polyethylene fiber paper impregnated with a vapor permeable polymer, polyethersulfone, sulfonated poly(ether ether ketone), and combinations thereof.

11. The system of claim 9 wherein the expirator is a membrane-based expirator and is thermally activated using thermal energy from a waste heat source.

12. The system of claim 9 wherein the expirator is a membrane-based expirator operatively configured with a desiccant wheel.

13. The system of claim 1 wherein the interior-defined channels comprise thin gaps formed between flat plates.

* * * * *